United States Patent
Turchetti et al.

(10) Patent No.: US 12,287,239 B2
(45) Date of Patent: Apr. 29, 2025

(54) INTEGRATED OPTICAL FIELD SAMPLING PLATFORM

(71) Applicants: Massachusetts Institute of Technology, Cambridge, MA (US); The Regents of the University of California, Oakland, CA (US); Deutsches Elektronen-Synchrontron DESY, Hamburg (DE)

(72) Inventors: Marco Turchetti, Cambridge, MA (US); Mina Bionta, Somerville, MA (US); Felix Ritzkowsky, Hamburg (DE); Yujia Yang, Vaud (CH); Dario Cattozzo Mor, Desenzano del Garda (IT); William Putnam, Martinez, CA (US); Franz X. Kaertner, Hamburg (DE); Karl K. Berggren, Arlington, MA (US); Phillip Donald Keathley, Natick, MA (US)

(73) Assignees: Massachusetts Institute of Technology, Cambridge, MA (US); The Regents of the University of California, Oakland, CA (US); Deutsches Elektronen-Synchotron DESY, Hamburg (DE)

( * ) Notice: Subject to any disclaimer, the term of this patent is extended or adjusted under 35 U.S.C. 154(b) by 819 days.

(21) Appl. No.: 17/471,758

(22) Filed: Sep. 10, 2021

(65) Prior Publication Data
US 2024/0369407 A1    Nov. 7, 2024

Related U.S. Application Data

(60) Provisional application No. 63/076,463, filed on Sep. 10, 2020.

(51) Int. Cl.
*G01J 1/44* (2006.01)
*B82Y 20/00* (2011.01)
*G02B 6/122* (2006.01)

(52) U.S. Cl.
CPC ............... *G01J 1/44* (2013.01); *B82Y 20/00* (2013.01); *G01J 2001/4446* (2013.01); *G02B 6/1226* (2013.01)

(58) Field of Classification Search
CPC ..... G01J 1/44; G01J 2001/4446; B82Y 20/00; G02B 6/1226
See application file for complete search history.

(56) References Cited

U.S. PATENT DOCUMENTS

| | | | | |
|---|---|---|---|---|
| 2013/0294729 A1* | 11/2013 | Layton | ................. | H01Q 21/064 |
| | | | | 385/40 |
| 2015/0131685 A1* | 5/2015 | Schiffrin | ........... | H01L 31/03044 |
| | | | | 372/30 |

OTHER PUBLICATIONS

Anderson et al. "Few-femtosecond plasmon dephasing of a single metallic nanostructure from optical response function reconstruction by interferometric frequency resolved optical gating." Nano letters 10.7 (2010): 2519-2524.

(Continued)

*Primary Examiner* — Georgia Y Epps
*Assistant Examiner* — Monica T Taba
(74) *Attorney, Agent, or Firm* — Smith Baluch LLP

(57) ABSTRACT

Some aspects are directed to an all-on-chip, optoelectronic device for sampling arbitrary, low-energy, near-infrared waveforms under ambient conditions. This solid-state integrated detector uses optical-field-driven electron emission from resonant nanoantennas to achieve petahertz-level switching speeds by generating on-chip attosecond electron burst. Also disclosed is a cross-correlation technique based on perturbation of local electron field emission rates that allows for the full characterization of arbitrary electric fields (Continued)

down to 1 femtojoule, and/or on the order of 500 kV/m, using plasmonic nanoantennas.

16 Claims, 32 Drawing Sheets
(31 of 32 Drawing Sheet(s) Filed in Color)

(56) References Cited

OTHER PUBLICATIONS

Bionta et al., "Towards Integrated Attosecond Time-Domain Spectroscopy," CLEO:2020 Abstract, May 11, 2020, 2 pages.
Bionta et al., "Towards integrated attosecond time-domain spectroscopy," CLEO:2020 Presentation, May 11, 2020, 26 pages.
Birge et al. "Two-dimensional spectral shearing interferometry for few-cycle pulse characterization." Optics letters 31.13 (2006): 2063-2065.
Bonvalet et al. "Femtosecond infrared emission resulting from coherent charge oscillations in quantum wells." Physical review letters 76.23 (1996): 4392, 4 pages.
Bunkin et al. "Cold emission of electrons from the surface of a metal in a strong radiation field." Sov. Phys. JETP 21.5 (1965): 896, 4 pages.
Cho et al. "Temporal characterization of femtosecond laser pulses using tunneling ionization in the UV, visible, and mid-IR ranges." Scientific reports 9.1 (2019): 1-11.
Ciappina et al. "Attosecond physics at the nanoscale." Reports on Progress in Physics 80.5 (2017): 054401, 51 pages.
Coddington et al. "Coherent multiheterodyne spectroscopy using stabilized optical frequency combs." Physical Review Letters 100.1 (2008): 013902, 4 pages.
Coddington et al. "Time-domain spectroscopy of molecular free-induction decay in the infrared." Optics letters 35.9 (2010): 1395-1397.
Dombi et al. "Strong-field nano-optics." Reviews of Modern Physics 92.2 (2020): 025003, 66 pages.
Fowler et al. "Electron emission in intense electric fields." Proceedings of the Royal Society of London. Series A, Containing Papers of a Mathematical and Physical Character 119.781 (1928): 173-181.
Gomer et al. Field emission and field ionization. vol. 34. Chapter 1, Cambridge: Harvard University Press, 1961, 35 pages.
Gomer et al. Field emission and field ionization. vol. 34. Chapter 5, Cambridge: Harvard University Press, 1961, 33 pages.
Hanke et al. "Efficient nonlinear light emission of single gold optical antennas driven by few-cycle near-infrared pulses." Physical Review Letters 103.25 (2009): 257404, 4 pages.
Hassan et al. "Optical attosecond pulses and tracking the nonlinear response of bound electrons." Nature 530.7588 (2016): 66-70.
Hohenleutner et al. "Real-time observation of interfering crystal electrons in high-harmonic generation." Nature 523.7562 (2015): 572-575.
Itatani et al. "Attosecond streak camera." Physical review letters 88.17 (2002): 173903, 4 pages.
Johnson et al. "Optical constants of the noble metals." Physical review B 6.12 (1972): 4370, 10 pages.
Keathley et al. "Vanishing carrier-envelope-phase-sensitive response in optical-field photoemission from plasmonic nanoantennas." Nature physics 15.11 (2019): 1128-1133.
Keiber et al. "Electro-optic sampling of near-infrared waveforms." Nature Photonics 10.3 (2016): 159-162.
Kienberger et al. "Atomic transient recorder." Nature 427.6977 (2004): 817-821.
Kim et al. "Petahertz optical oscilloscope." Nature Photonics 7.12 (2013): 958-962.
Kowligy et al. "Infrared electric field sampled frequency comb spectroscopy." Science advances 5.6 (2019): eaaw8794, 8 pages.
Krausz et al. "Attosecond metrology: from electron capture to future signal processing." Nature Photonics 8.3 (2014): 205-213.
Kruger et al. "Attosecond control of electrons emitted from a nanoscale metal tip." Nature 475.7354 (2011): 78-81.
Kruger et al. "Attosecond physics phenomena at nanometric tips." Journal of Physics B: Atomic, Molecular and Optical Physics 51.17 (2018): 172001, 34 pages.
Lepine et al. "Attosecond molecular dynamics: fact or fiction?." Nature Photonics 8.3 (2014): 195-204.
Ludwig et al. "Active control of ultrafast electron dynamics in plasmonic gaps using an applied bias." Physical Review B 101.24 (2020): 241412, 6 pages.
Ludwig et al. "Sub-femtosecond electron transport in a nanoscale gap." Nature Physics 16.3 (2020): 341-345.
Neu et al. "Tutorial: An introduction to terahertz time domain spectroscopy (THz-TDS)." Journal of Applied Physics 124.23 (2018): 231101, 15 pages.
Park et al. "Direct sampling of a light wave in air." Optica 5.4 (2018): 402-408.
Picque et al. "Frequency comb spectroscopy." Nature Photonics 13.3 (2019): 146-157.
Pupeza et al. "Field-resolved infrared spectroscopy of biological systems." Nature 577.7788 (2020): 52-59.
Putnam et al. "Few-cycle, carrier-envelope-phase-stable laser pulses from a compact supercontinuum source." JOSA B 36.2 (2019): A93-A97.
Putnam et al. "Optical-field-controlled photoemission from plasmonic nanoparticles." nature physics 13.4 (2017): 335-339.
Riek et al. "Direct sampling of electric-field vacuum fluctuations." Science 350.6259 (2015): 420-423.
Rybka et al., "Sub-cycle optical phase control of nanotunnelling in the single-electron regime," Nature Photonics, 10 (2016), 5 pages.
Schiffrin et al. "Optical-field-induced current in dielectrics." Nature 493.7430 (2013): 70-74.
Schotz et al. "Perspective on petahertz electronics and attosecond nanoscopy." ACS photonics 6.12 (2019): 3057-3069.
Schotz et al. "Reconstruction of nanoscale near fields by attosecond streaking." IEEE Journal of Selected Topics in Quantum Electronics 23.3 (2017): 8700111.
Schubert et al. "Sub-cycle control of terahertz high-harmonic generation by dynamical Bloch oscillations." Nature photonics 8.2 (2014): 119-123.
Schultze et al. "Controlling dielectrics with the electric field of light." Nature 493.7430 (2013): 75-78.
Sell et al. "8-fs pulses from a compact Er: fiber system: quantitative modeling and experimental implementation." Optics express 17.2 (2009): 1070-1077.
Stockman "Nanoplasmonics: past, present, and glimpse into future." Optics express 19.22 (2011): 22029-22106.
Stockman et al. "Roadmap on plasmonics." Journal of Optics 20.4 (2018): 043001, 40 pages.
Sun et al. "Direct imaging of the near field and dynamics of surface plasmon resonance on gold nanostructures using photoemission electron microscopy." Light: science & applications 2.12 (2013): e118-e118.
ThorLabs: High Speed thz time domain spectrometer, https://www.thorlabs.com/newgrouppage9.cfm?objectgroup_id=8054, accessed: Jun. 24, 2020, 2 pages.
Turchetti et al, "Low-Energy Optical Pulse Detection Using Biased Plasmonic Nanoantenna," CLEO: QELS_Fundamental Science. Optical Society of America, 2020, 2 pages.
Wirth et al. "Synthesized light transients." Science 334.6053 (2011): 195-200.
Yalunin et al. "Strong-field photoemission from surfaces: Theoretical approaches." Physical Review B 84.19 (2011): 195426, 14 pages.
Yang et al. "Light Phase Detection with On-Chip Petahertz Electronic Networks." arXiv preprint arXiv:1912.07130 (2019) 39 pages.
Yang et al. "Light phase detection with on-chip petahertz electronic networks." Nature communications 11.1 (2020): 1-11.
Young et al., "Roadmap of ultrafast x-ray atomic and molecular physics," J. Phys. B At. Mol. Opt. Phys. 51, Mar. 2003 (2018), 46 pages.

\* cited by examiner

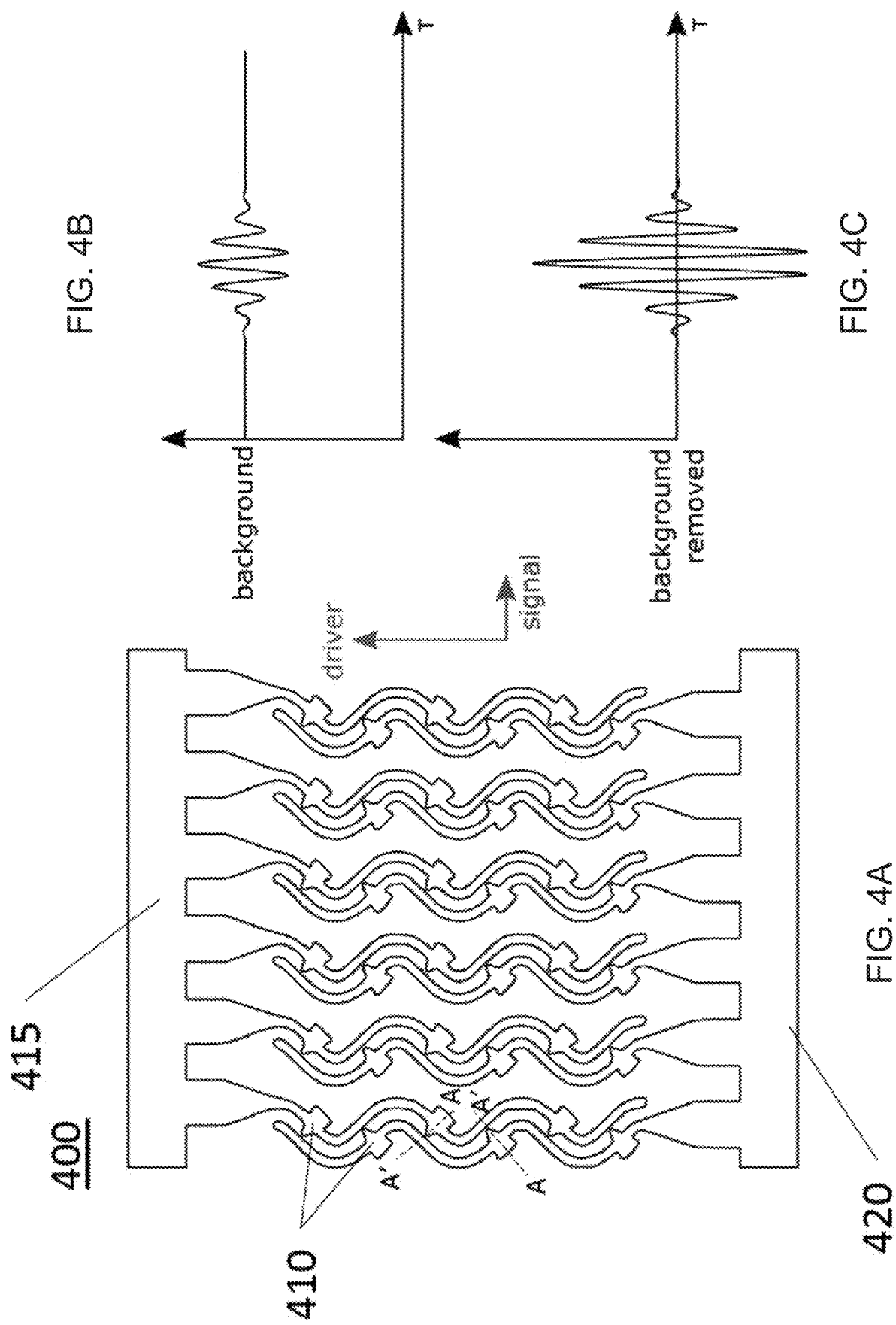

INTEGRATED OPTICAL FIELD SAMPLING PLATFORM

CROSS-REFERENCE TO RELATED APPLICATION(S)

This application claims priority to U.S. Provisional Application No. 63/076,463 filed Sep. 10, 2020, titled "INTEGRATED OPTICAL FIELD SAMPLING PLATFORM", the entire disclosure of which is hereby incorporated by reference.

STATEMENT OF GOVERNMENT SUPPORT

This invention was made with government support under FA9550-19-1-0065 and FA9550-18-1-0436 awarded by the Air Force Office of Scientific Research. The government has certain rights in the invention.

BACKGROUND

Time-domain sampling of arbitrary electric fields with sub-cycle resolution can be useful for a complete time and/or frequency analysis of a system's response to optical illumination. This time-frequency picture provides access to dynamic information that is not provided by absorption spectra alone, and has been instrumental in improving understanding of ultrafast light-matter interactions in solids that give rise to nonlinear phenomena. Furthermore, it has recently been shown that nonlinear, sub-cycle, optical-field sampling in the infrared can offer superior performance compared to traditional spectroscopic methods for the characterization of biological systems. However, despite such innovations, time-domain, sub-cycle, optical field sampling systems operating in the visible to near-infrared spectral regions are not available, and would conceivably require large driving pulse energies that in turn necessitate large laser amplifier systems, bulky apparatuses, and vacuum environments.

SUMMARY

In some aspects, a method of detection of an incident optical signal including a set of incident pulses includes applying, to a set of optical detectors formed on a substrate, a driving optical signal including a set of driving pulses. Each optical detector of the set of optical detectors includes an antenna electrode configured as a cathode and having a tip shaped to enhance a local electric field generated in response to the driving optical signal, and a wire electrode configured as an anode and positioned such that the tip of antenna electrode and the wire electrode generate a photocurrent therebetween via tunneling in response to the driving optical signal. The method also includes applying, to the set of optical detectors, the incident optical signal with variable delay with respect to the driving optical signal to modulate the photocurrent from each optical detector of the set of optical detectors as a function of the variable delay. The method further includes detecting, via a current detector coupled to the set of optical detectors, an integrated photocurrent based on the photocurrent from each antenna electrode of the set of optical detectors. The method also includes detecting a presence of the incident optical signal in response to the integrated photocurrent exceeding a predetermined threshold.

In some aspects, an apparatus for optical sampling includes a substrate and a set of optical detectors coupled to the substrate. Each optical detector of the set of optical detectors includes an antenna electrode configured as a cathode and having a tip shaped to enhance a local electric field generated in response to a driving optical signal applied to the set of optical detectors. Each optical detector further includes a wire electrode configured as an anode, and positioned such that the tip of antenna electrode and the wire electrode generate a photocurrent therebetween via tunneling in response to the driving optical signal. The set of optical detectors are further configured to receive an incident optical signal with variable delay with respect to the driving optical signal, such that the photocurrent from each optical detector of the set of optical detectors is modulated as a function of the variable delay. The apparatus also includes a current detector coupled to the set of optical detectors to detect an integrated photocurrent based on the photocurrent from each antenna electrode of the set of optical detectors, such that a presence of the incident optical signal is detectable in response to the integrated photocurrent exceeding a predetermined threshold.

In some aspects, a method disclosed herein is for sampling an optical signal field with a nanoantenna cathode, an anode electrically separated from the nanoantenna cathode, and a current detector in electrical communication with the nanoantenna cathode and the anode. The method includes illuminating the nanoantenna cathode with an optical driving pulse, the optical driving pulse generating an enhanced local electrical field at a tip of the nanoantenna cathode, the enhanced local electrical field creating a tunneling photocurrent from the nanoantenna cathode to the anode. The method further includes illuminating the nanoantenna cathode with the optical signal field, the optical signal field generating a local signal field in the nanoantenna cathode that modulates the tunneling photocurrent as a function of a delay between the optical signal field and the optical driving pulse. The method also includes detecting modulation of the tunneling photocurrent with the current detector.

All combinations of the foregoing concepts and additional concepts are discussed in greater detail below (provided such concepts are not mutually inconsistent) and are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The patent or application file contains at least one drawing executed in color. Copies of this patent or patent application publication with color drawing(s) will be provided by the Office upon request and payment of the necessary fee.

FIG. 1A illustrates a device for optical sampling. A probe signal generates an electron wave packet at the nanoantenna, and a perturbing, weak incident signal is also illustrated. The time integrated current is detected through leads connected to the nanoantenna and the collector wire.

Figure 1A:
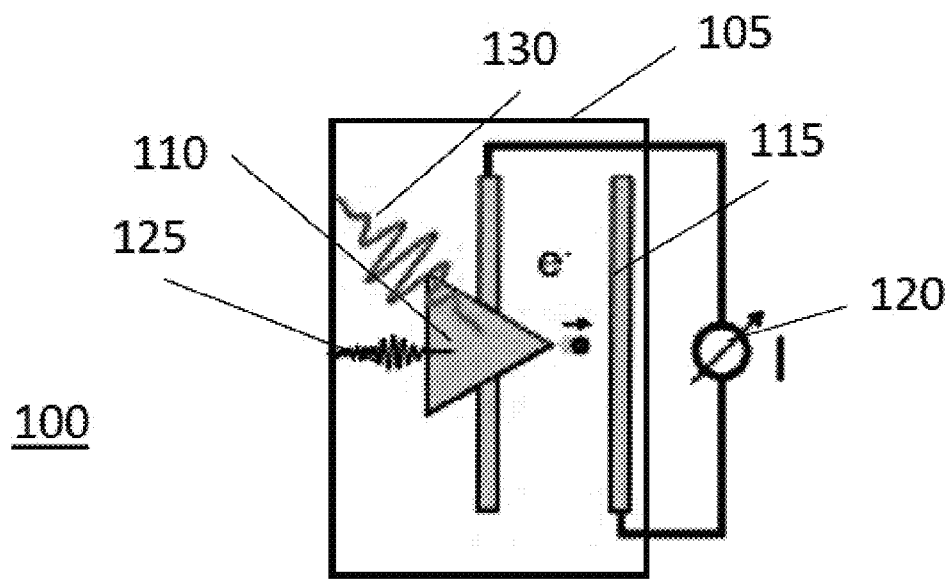
FIG. 1B illustrates an apparatus for optical sampling that includes an array of the device of FIG. 1A.
FIG. 1C is a scanning electron micrograph of the array of FIG. 1B.
Figure 1B:
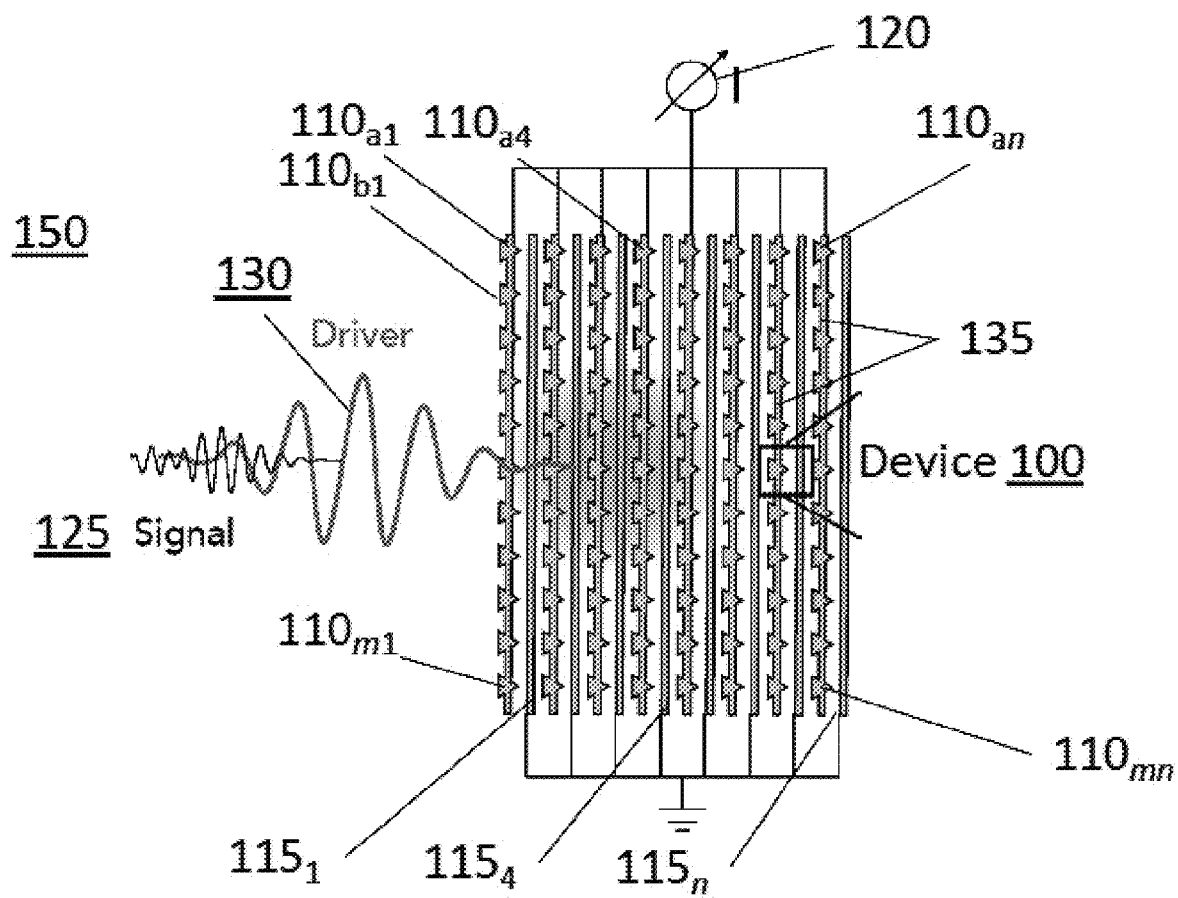
Figure 3A:
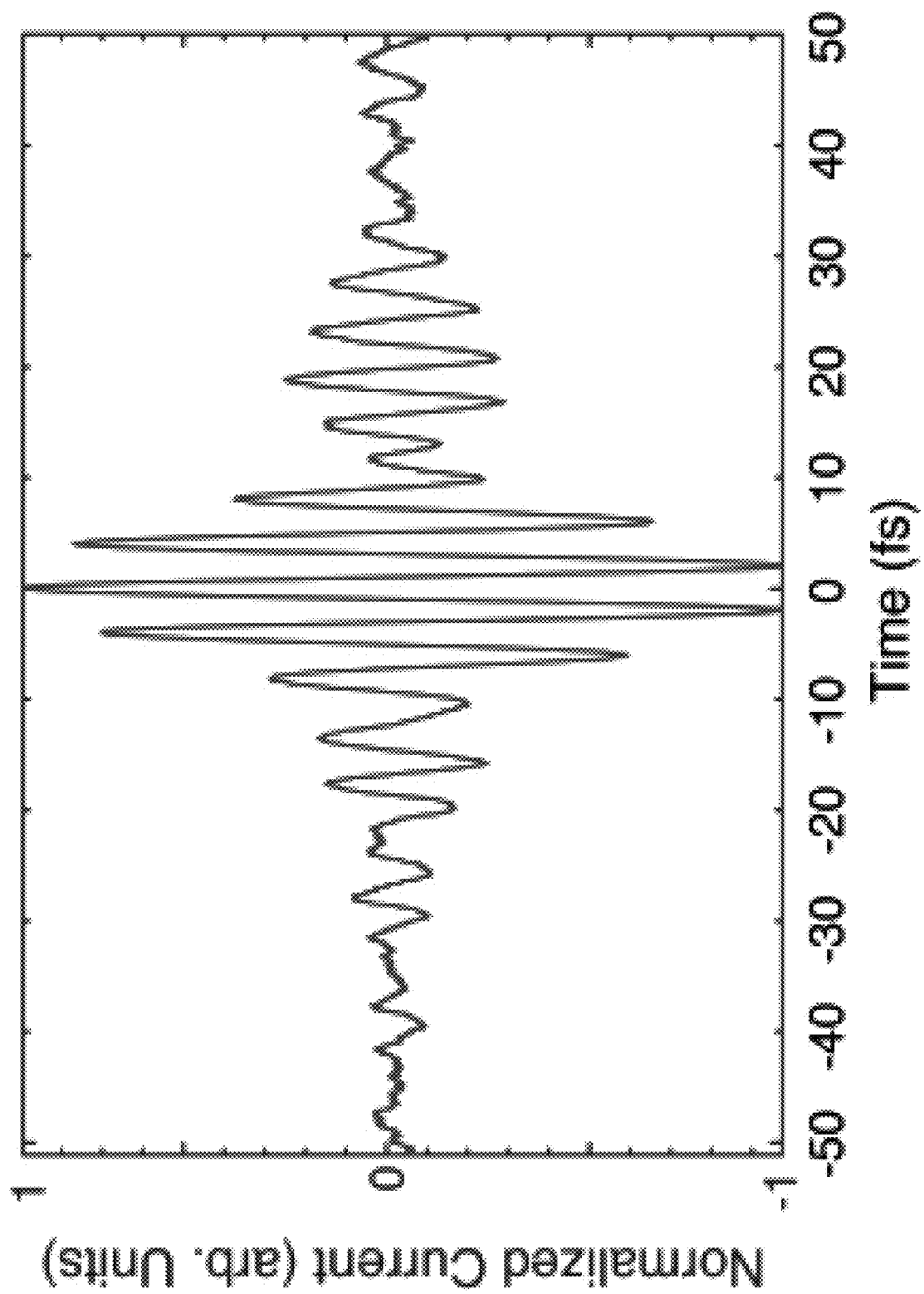
Figure 3B:
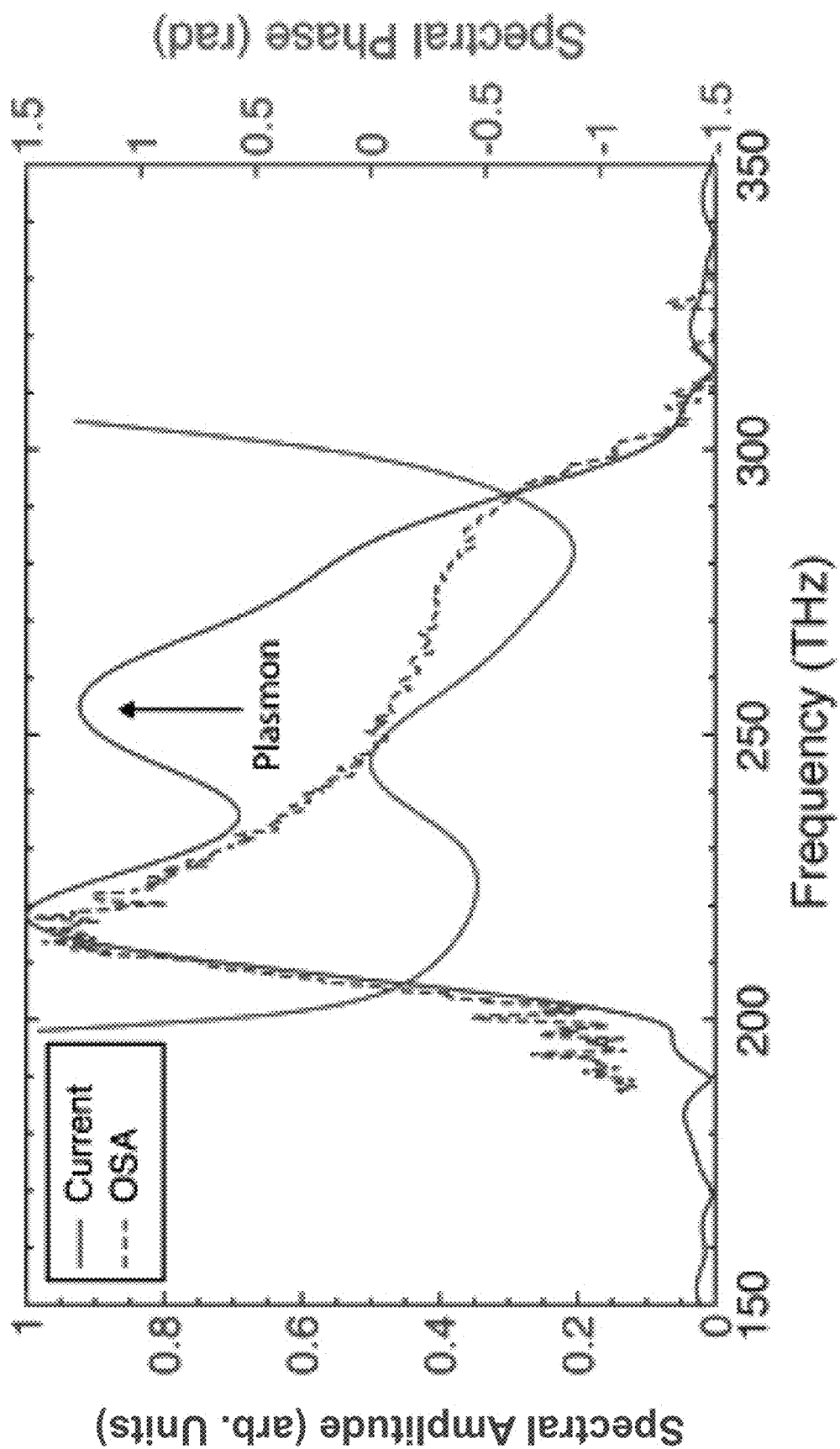

FIG. 3A is a plot of a cross-correlation trace normalized small-signal cross correlation trace of a 50 pJ and 5 fJ pulse pair measured through the detection of the integrated field emission current from the apparatus of FIG. 1B FIG. 3B is a plot of a Fourier transform of the cross-correlation trace of FIG. 3A showing the spectral amplitude (solid line, left axis) and spectral phase (solid line, right axis). For reference the spectral amplitude of the incident pulse measured using an optical spectrum analyzer (OSA) is also shown (dashed line).

FIG. 4A illustrates another apparatus for optical sampling with the detectors arranged for balanced detection of an incident signal.

FIG. 4B is a plot illustrating electrical response of the apparatus of FIG. 1B, without balanced detection.

FIG. 4C is a plot illustrating electrical response of the apparatus of FIG. 4A, with balanced detection.

Figure 5:
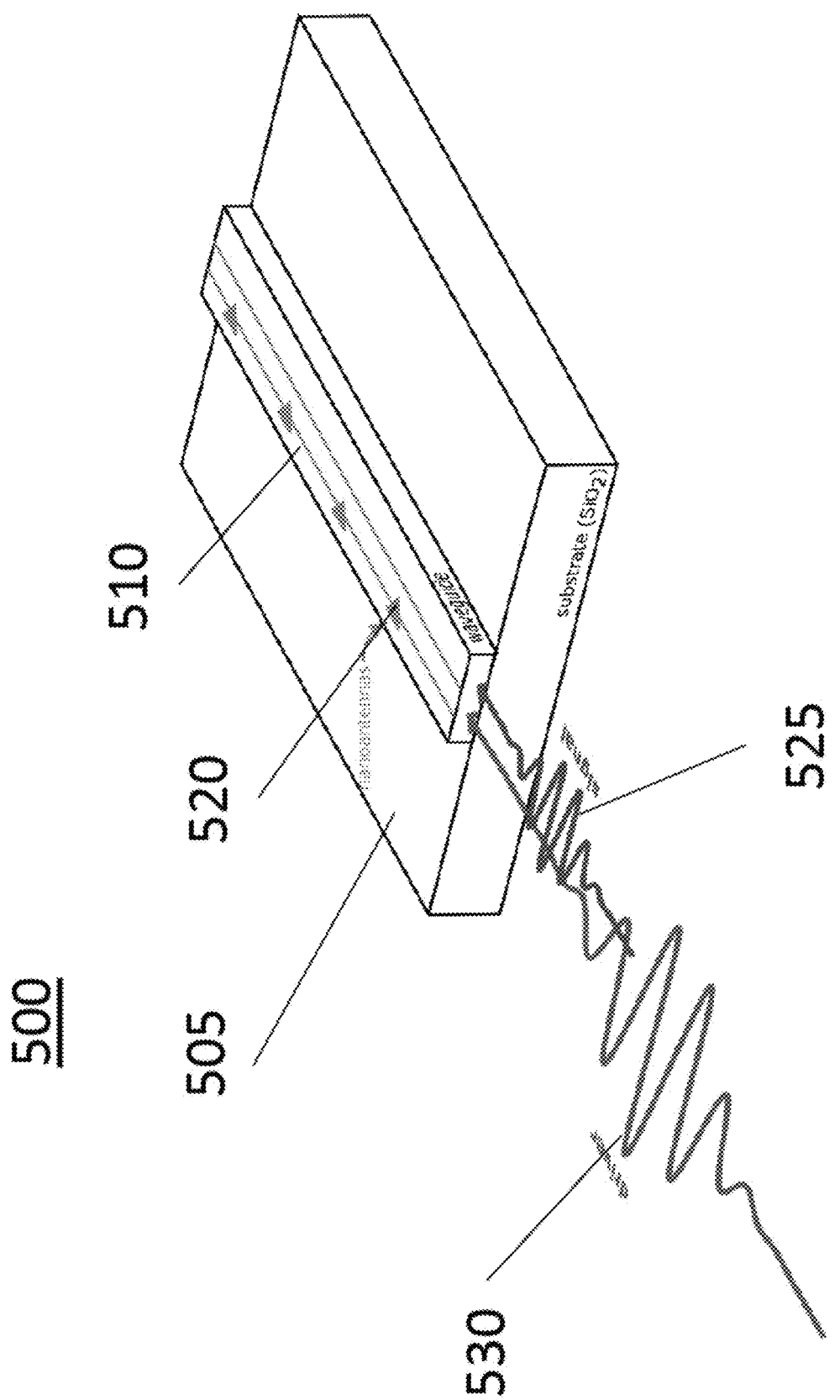

FIG. 5 illustrates a waveguide-integrated chip employing the device of FIG. 1A for optical sampling.

Figure 6A:
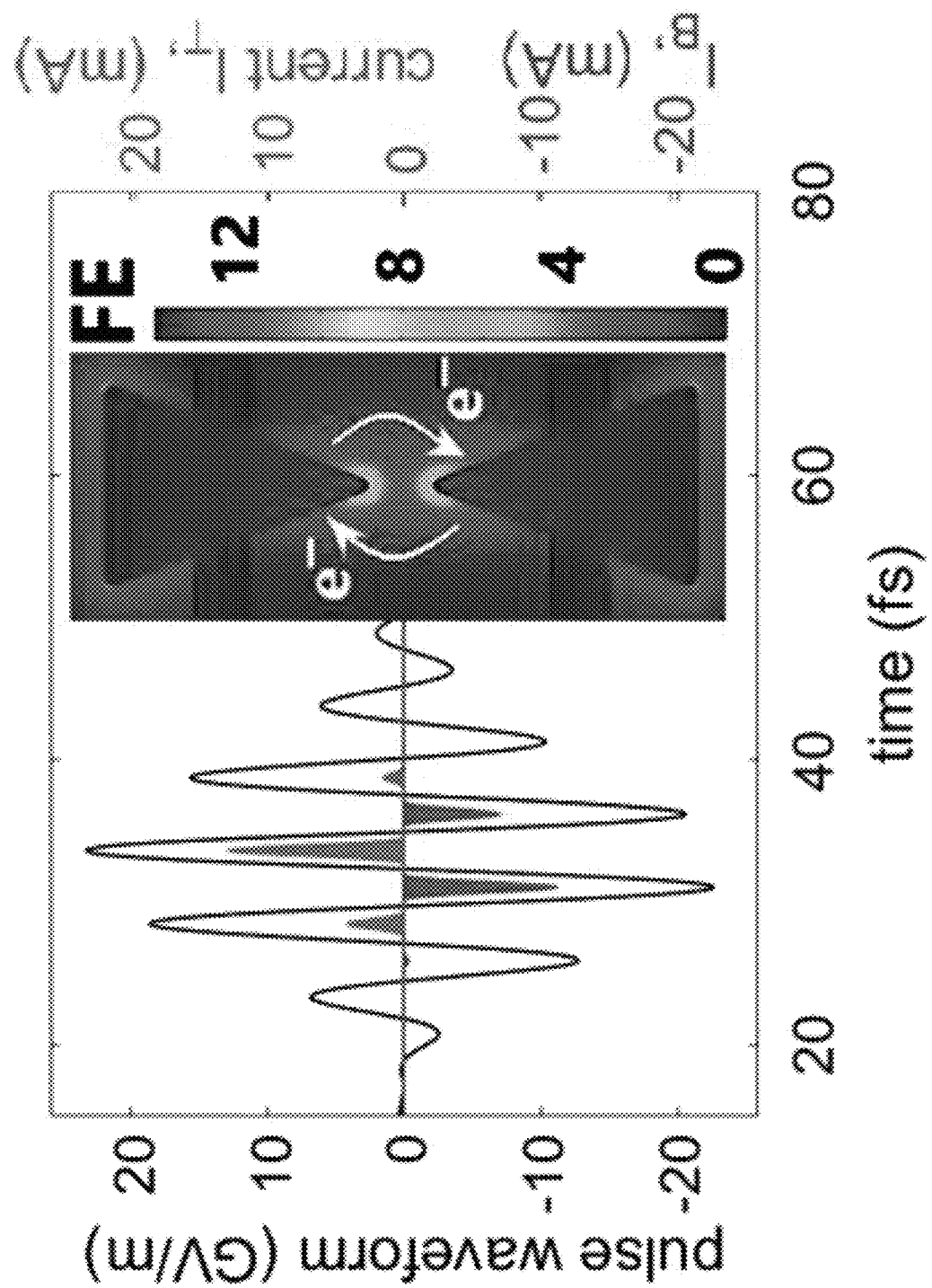
Figure 6B:
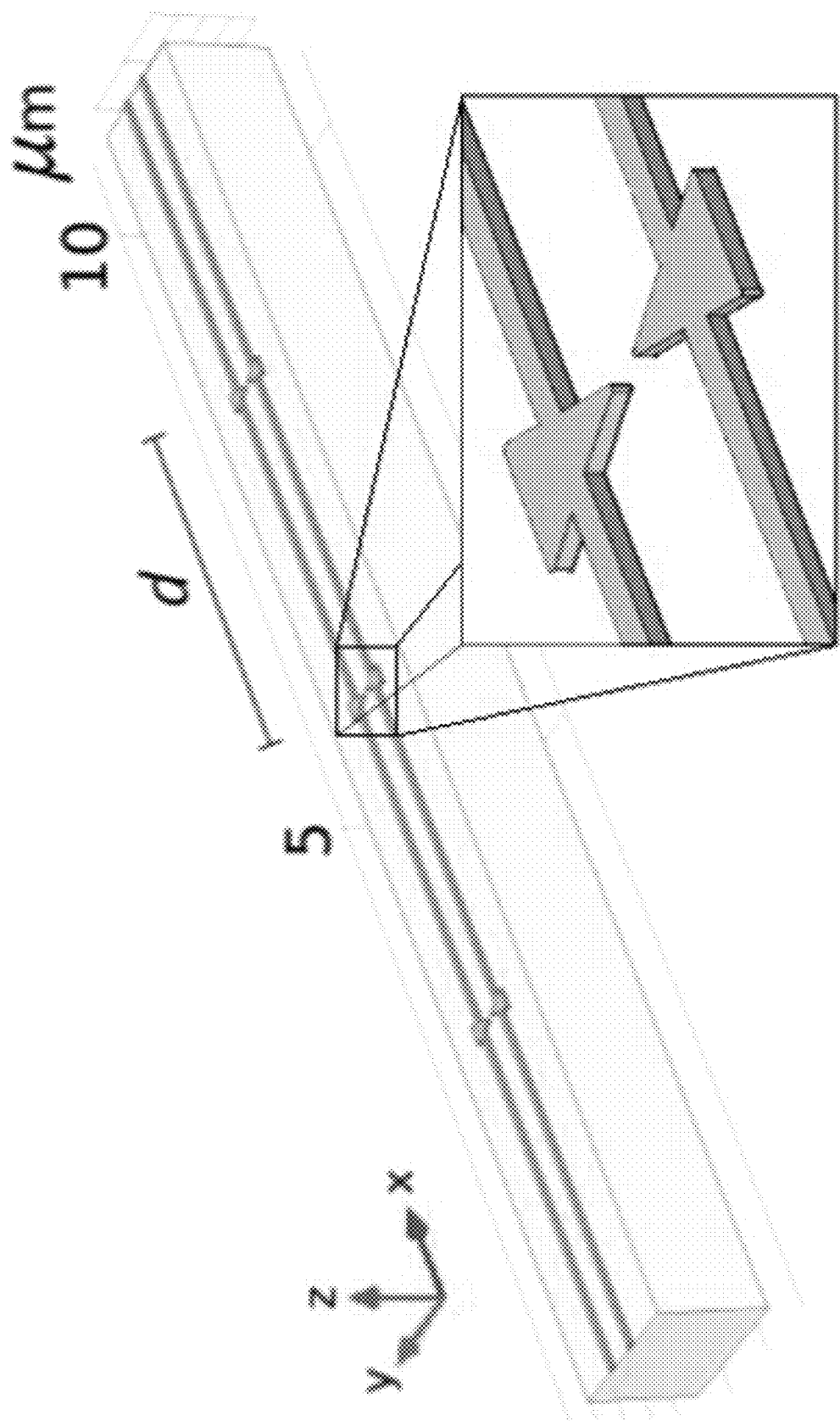

FIG. 6A illustrates an example field waveform of an enhanced, detectable current pulse at the tip of the first antenna of the device of FIG. 6B and the resulting attosecond photocurrent bursts. The current from the top antenna is shown in red, and the current from the bottom antenna is shown in blue. The inset shows the field enhancement at the tip of one of the antennae of the device of FIG. 6B. The total current (red minus blue) alternates when the phase of the current pulse is shifted.

FIG. 6B illustrates electrically-connected bow-tie carrier envelope phase (CEP) detectors/devices integrated onto a dielectric waveguide that employ two antennae instead of the one antenna of the device of FIG. 1A.

Figure 6C:
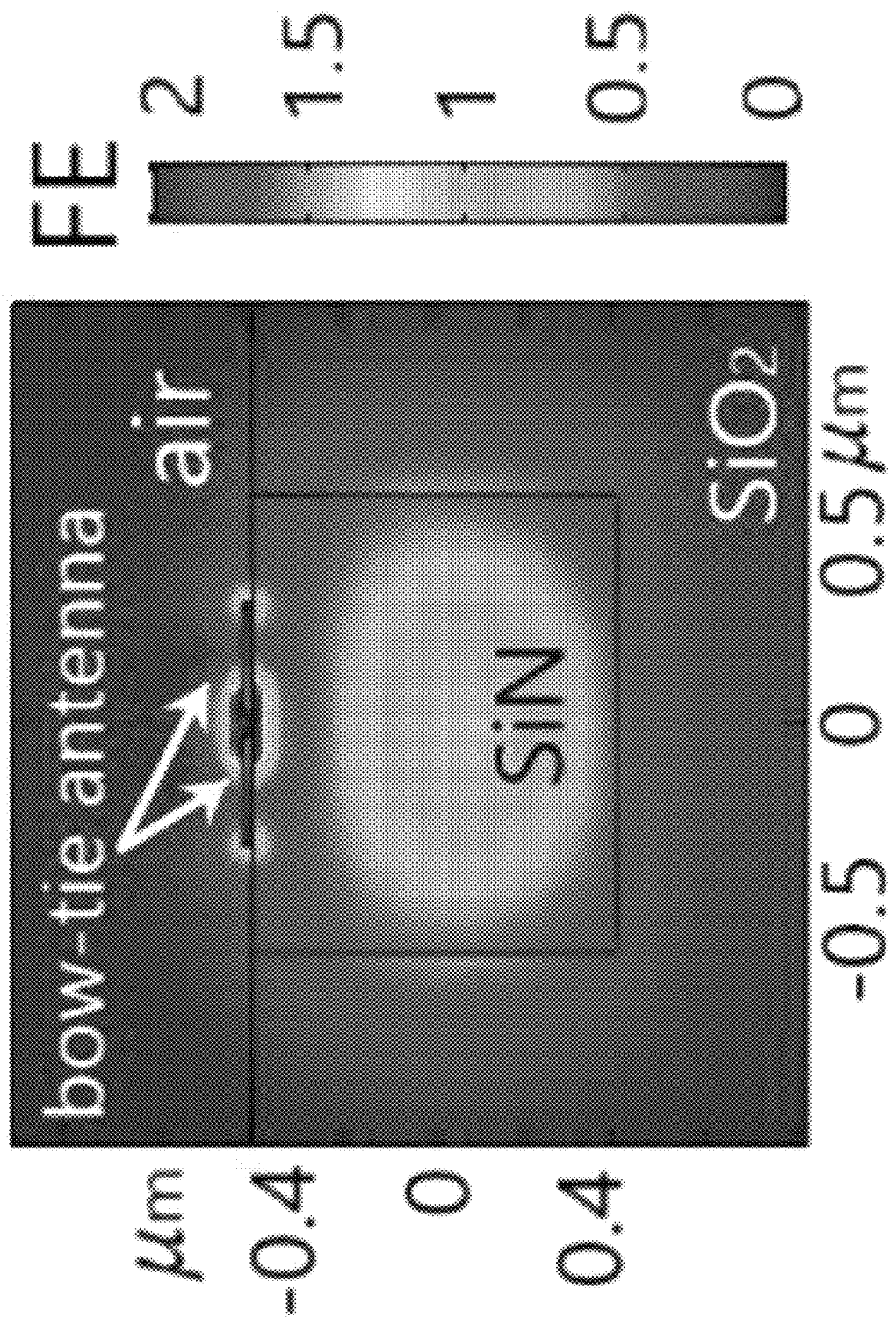

FIG. 6C illustrates cross-sectional field distribution both at the input port of the waveguide of FIG. 6B and at the center of one of the devices of FIG. 6B for an injected wavelength of 1.55 micrometers. The waveguide and antenna sizes can be tuned to operate at different wavelengths.

Figure 7:
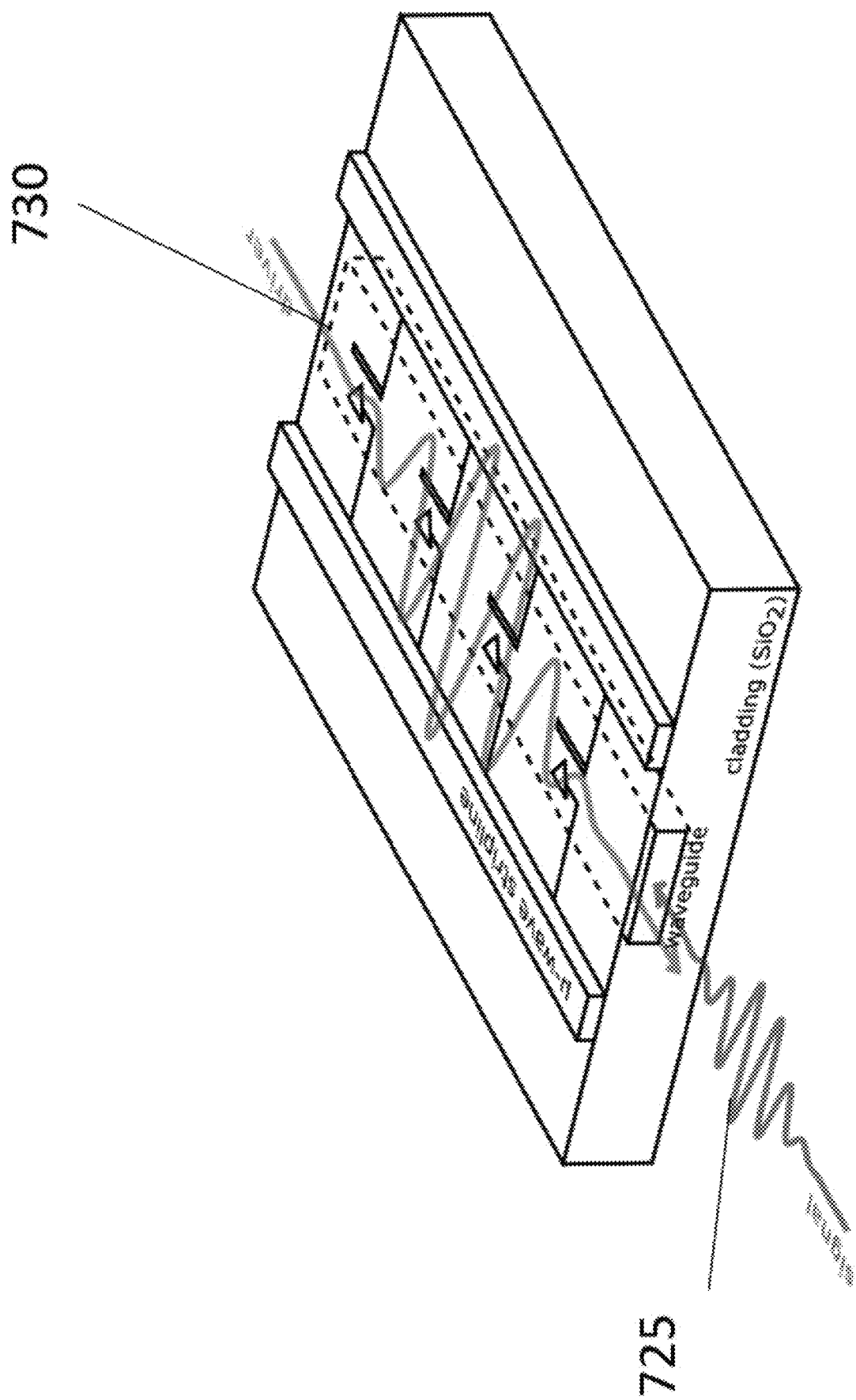

FIG. 7 illustrates an integrated chip including a set of devices of FIG. 5 with counterpropagating signal and driver, configured for single-shot field sampling detection.

Figure 8:
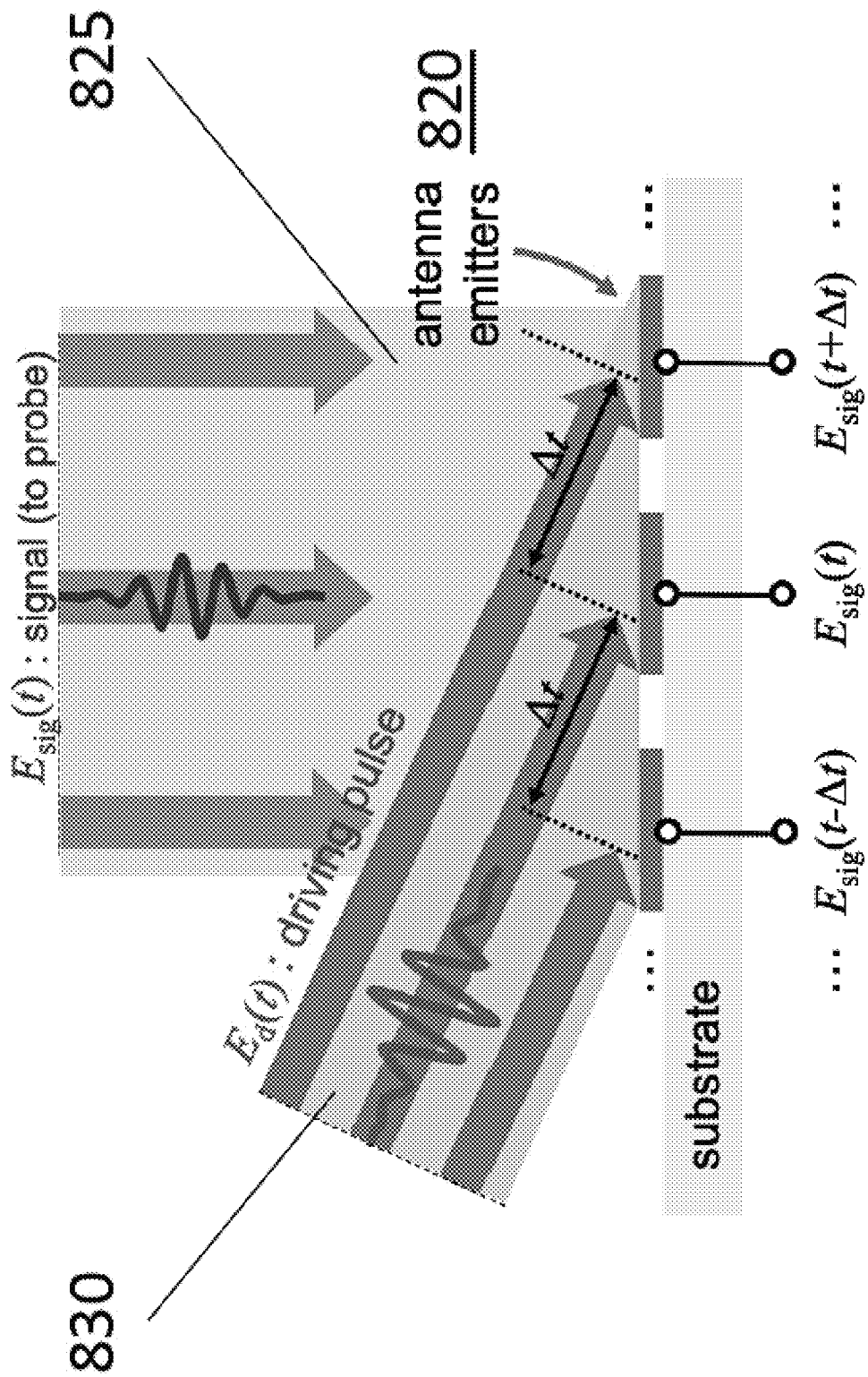

FIG. 8 illustrates another integrated chip including a set of devices of FIG. 5 with two antennae each and configured for single-shot field sampling detection, with tilted pulse fronts for free-space detection.

Figure 9:
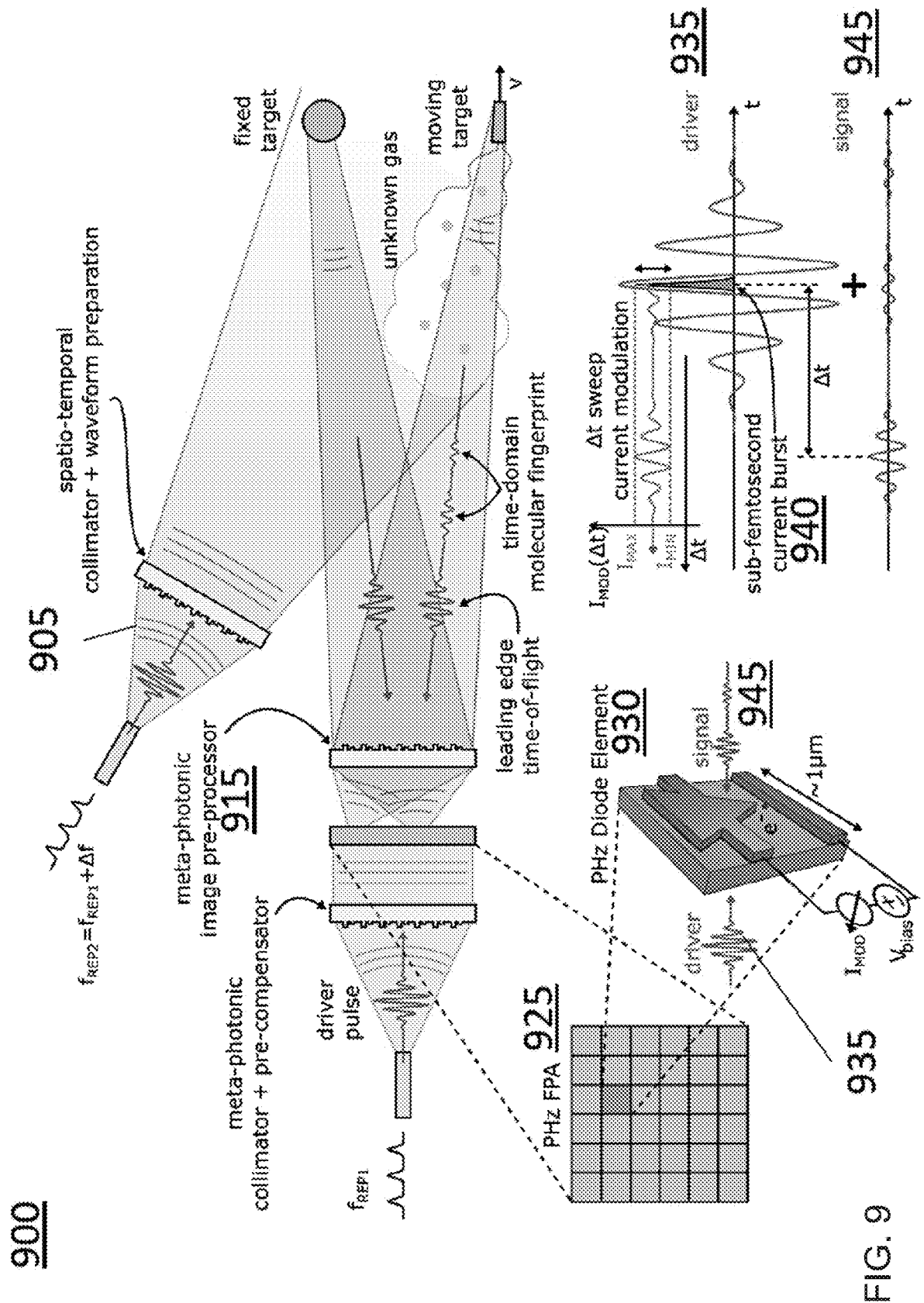

FIG. 9 illustrates a setup for hyperspectral imaging.

Figure 10A:
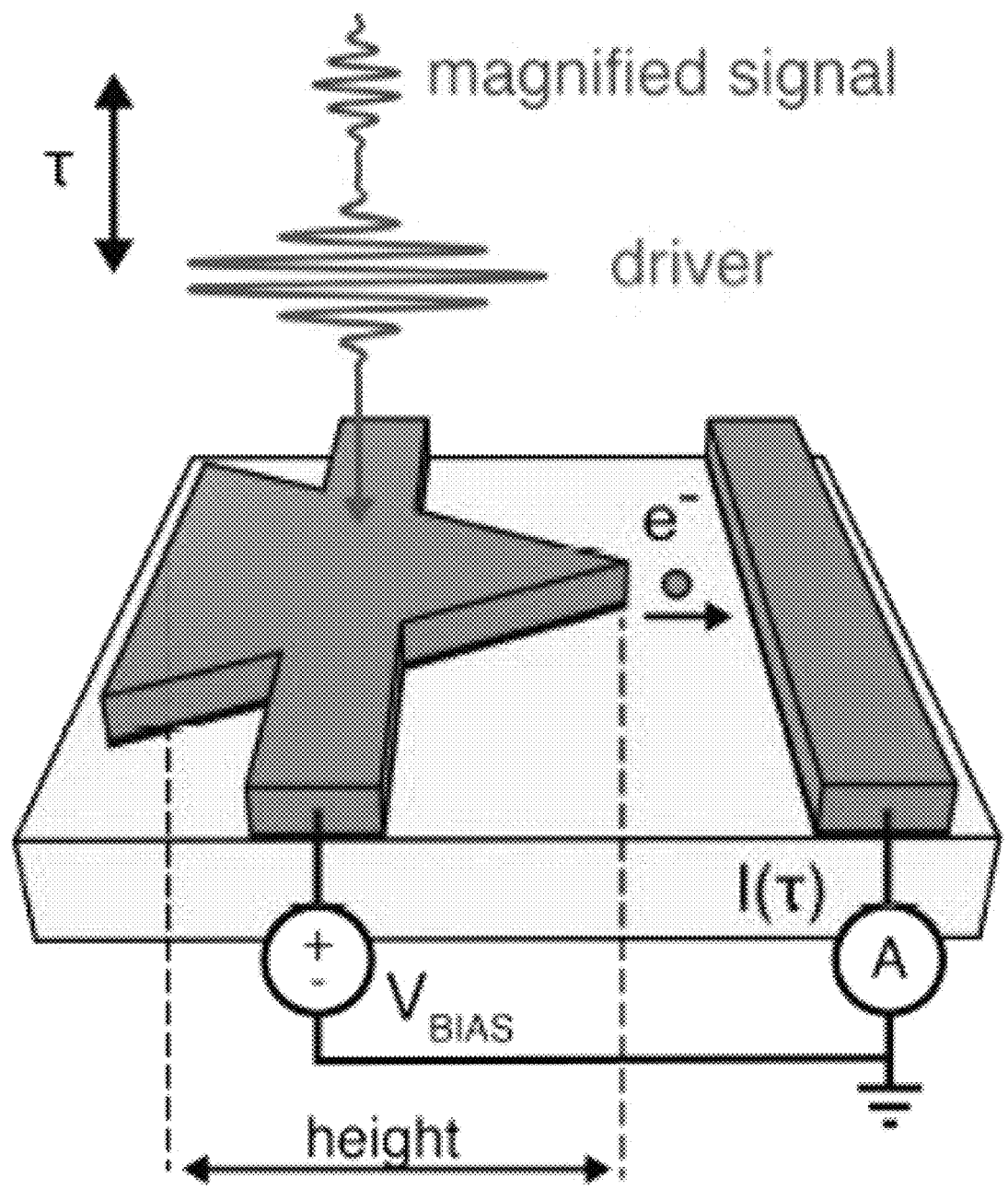

FIG. 10A illustrates a schematic of the device.

Figure 10B:
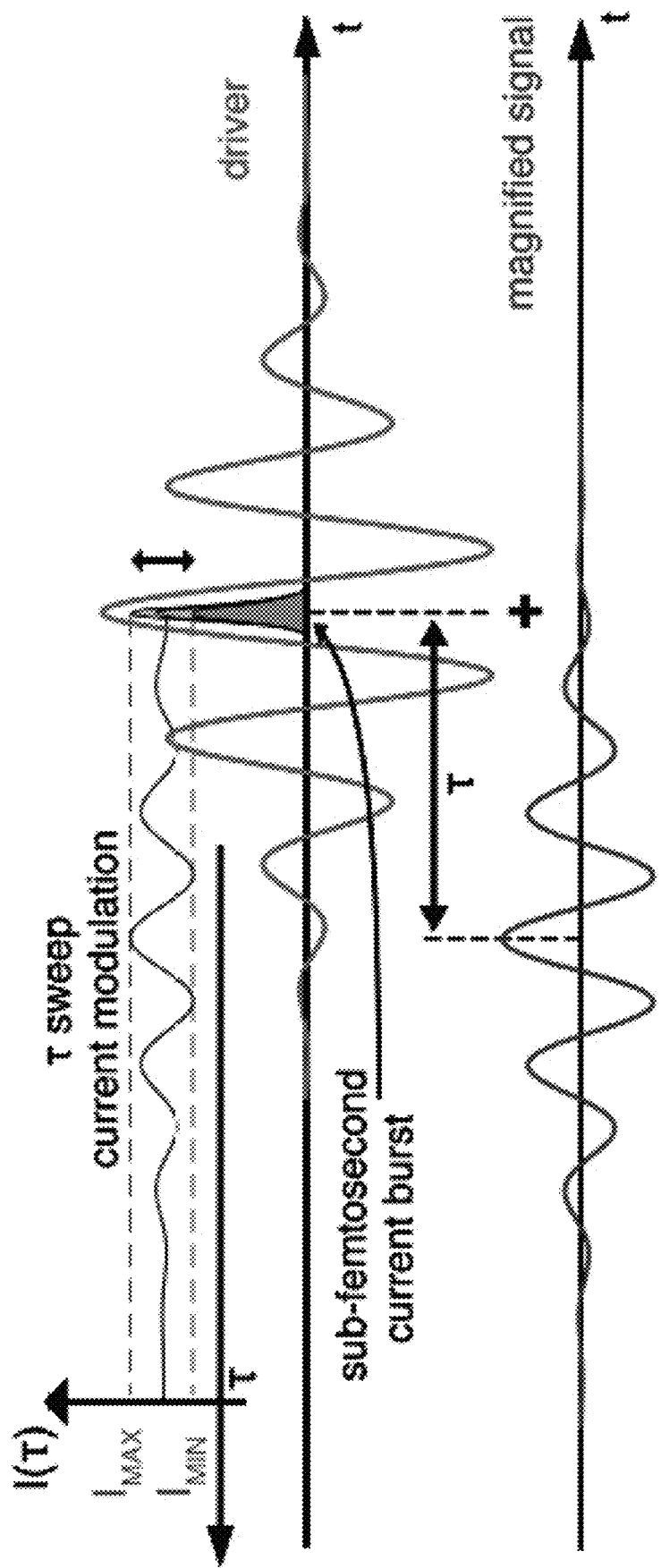

FIG. 10B illustrates a depiction of the optical-field sampling process. Attosecond electron bursts are driven from an electrically-connected gold nanoantenna (as shown in FIG. 10A) by a strong optical waveform (driver, red), collected by an adjacent gold wire, then measured using an external current detector (I(τ) is the measured current). The weak signal waveform (blue), with a peak intensity of $1 \times 10^{-4}$ that of the driver pulses, modulates the average photocurrent generated by the driver pulse, I(τ), as a function of delay, τ (grey). The amplitude of the signal waveform is artificially magnified in FIG. 10A and FIG. 10B for visibility but would be roughly two orders of magnitude smaller than the driver waveform.

Figures 10C, 10D, 10E:
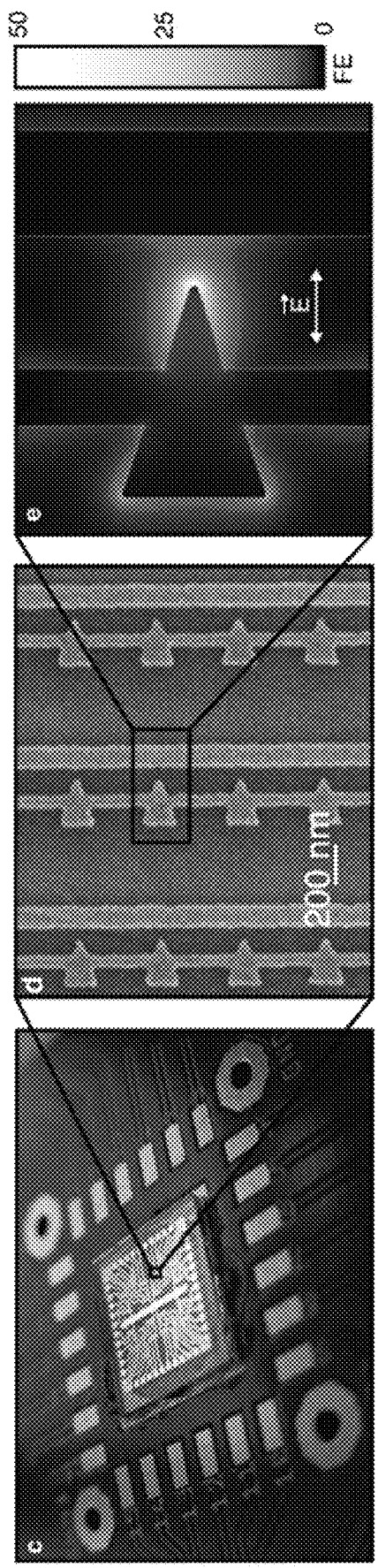

FIG. 10C is a photograph of the nanocircuit embedded on printed circuit board.

FIG. 10D shows a scanning electron micrograph of the device.

FIG. 10E shows a simulated electric field enhancement around a nanoantenna. FE: field enhancement factor. E: arrow indicates polarization of the incident electric field.

Figure 11A:
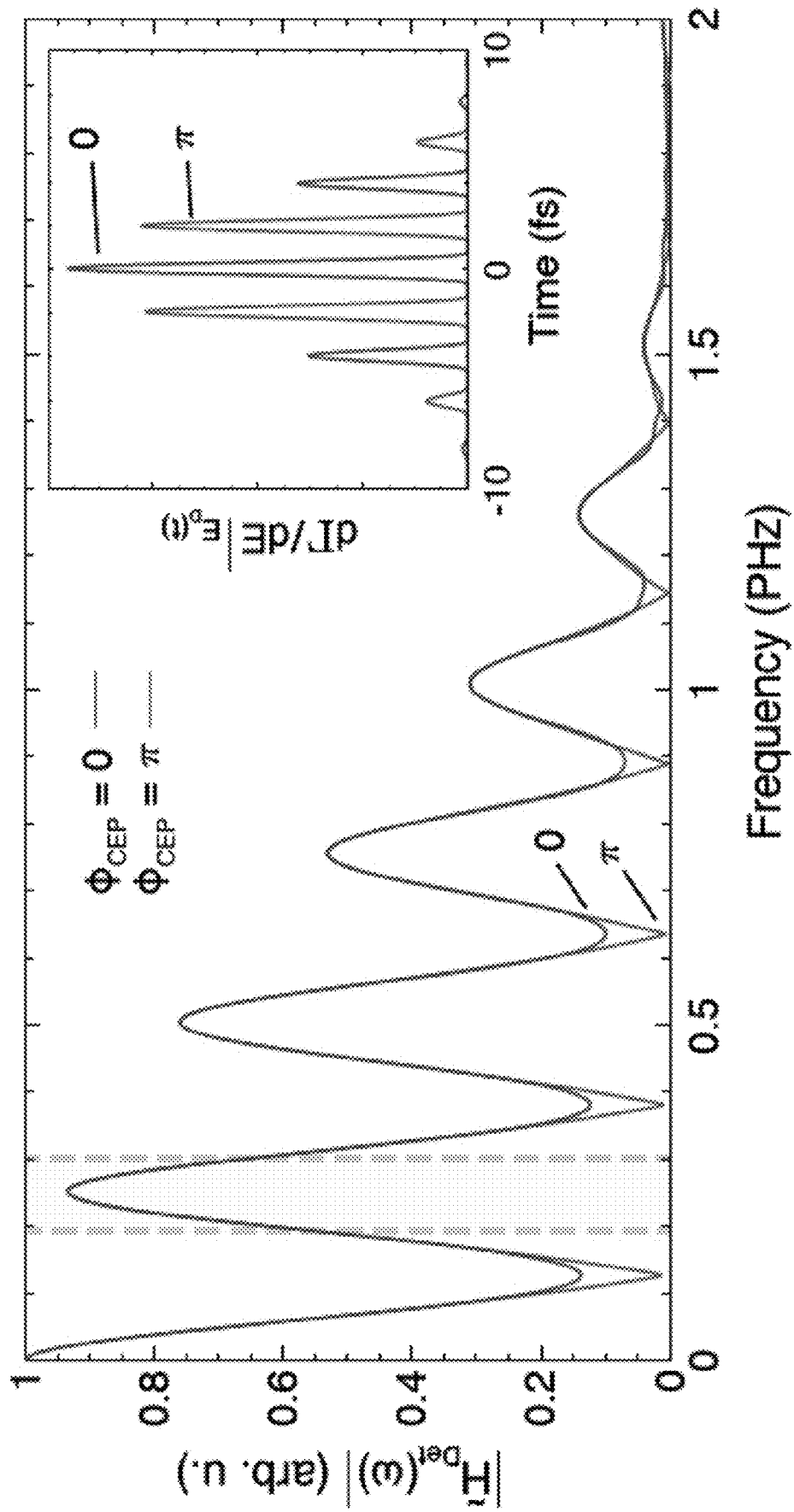

FIG. 11A illustrates the theoretical sampling bandwidth. The calculation of the accessible sampling bandwidth $\tilde{H}_{Det}(\omega)$ as dictated by the Fourier transform of $$\frac{d\Gamma}{dE}\bigg|_{E_D^{(L)}(t)}$$

for the carrier-envelope phases $\Phi_{CEP}=0, \pi$ of the driver pulse. (Inset) The time-domain picture of $$\frac{d\Gamma}{dE}\bigg|_{E_D^{(L)}(t)}$$

corresponding to the bandwidth is shown in FIG. 11A

Figure 11B:
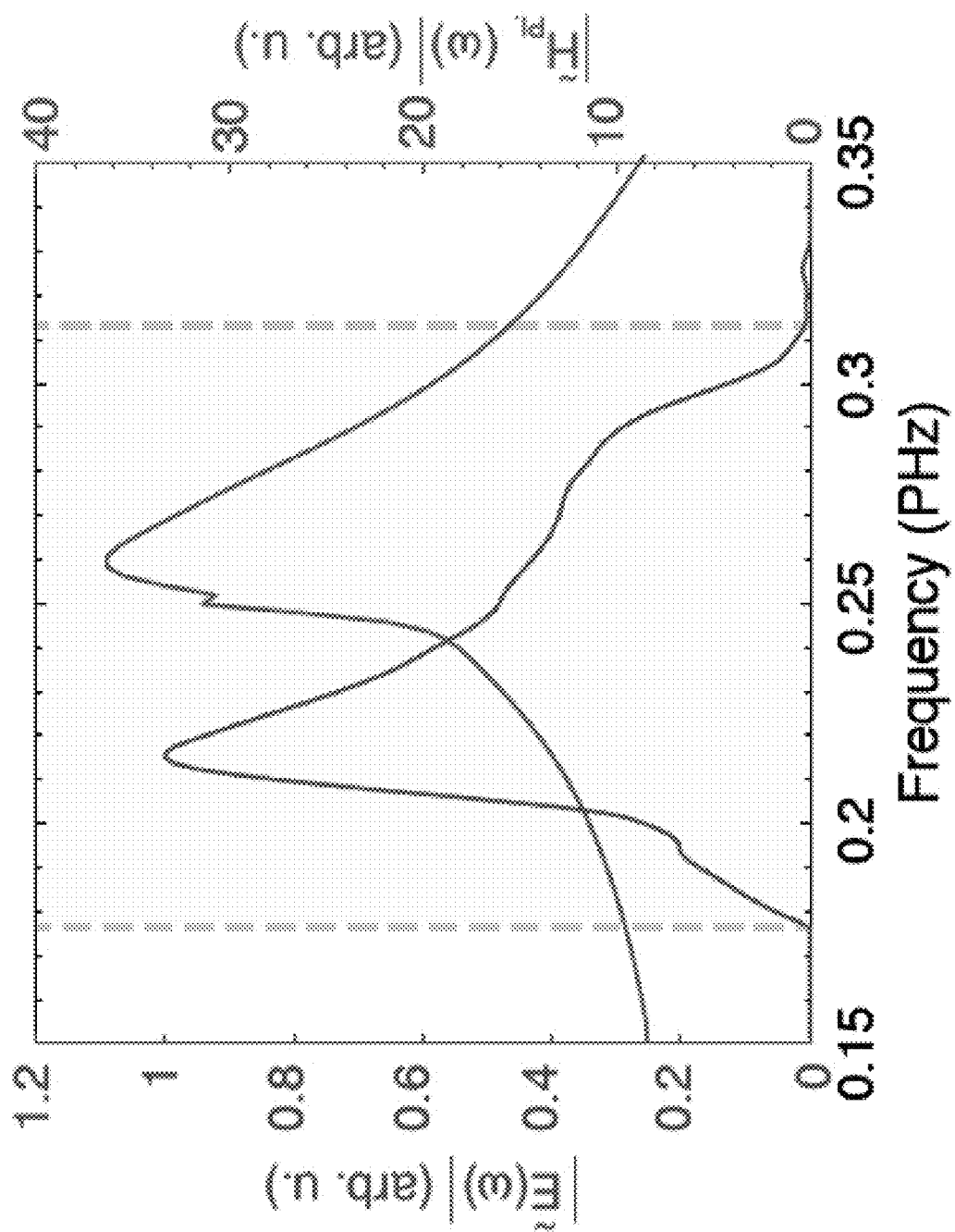

FIG. 11B illustrates the spectral amplitude of the driving pulse (blue) and the plasmonic nanoantenna transfer function $|\tilde{H}_{PL}(\omega)|$ (red). The shaded area in FIGS. 11A and 11B indicates the spectral region occupied by the driving pulse.

Figure 12A:
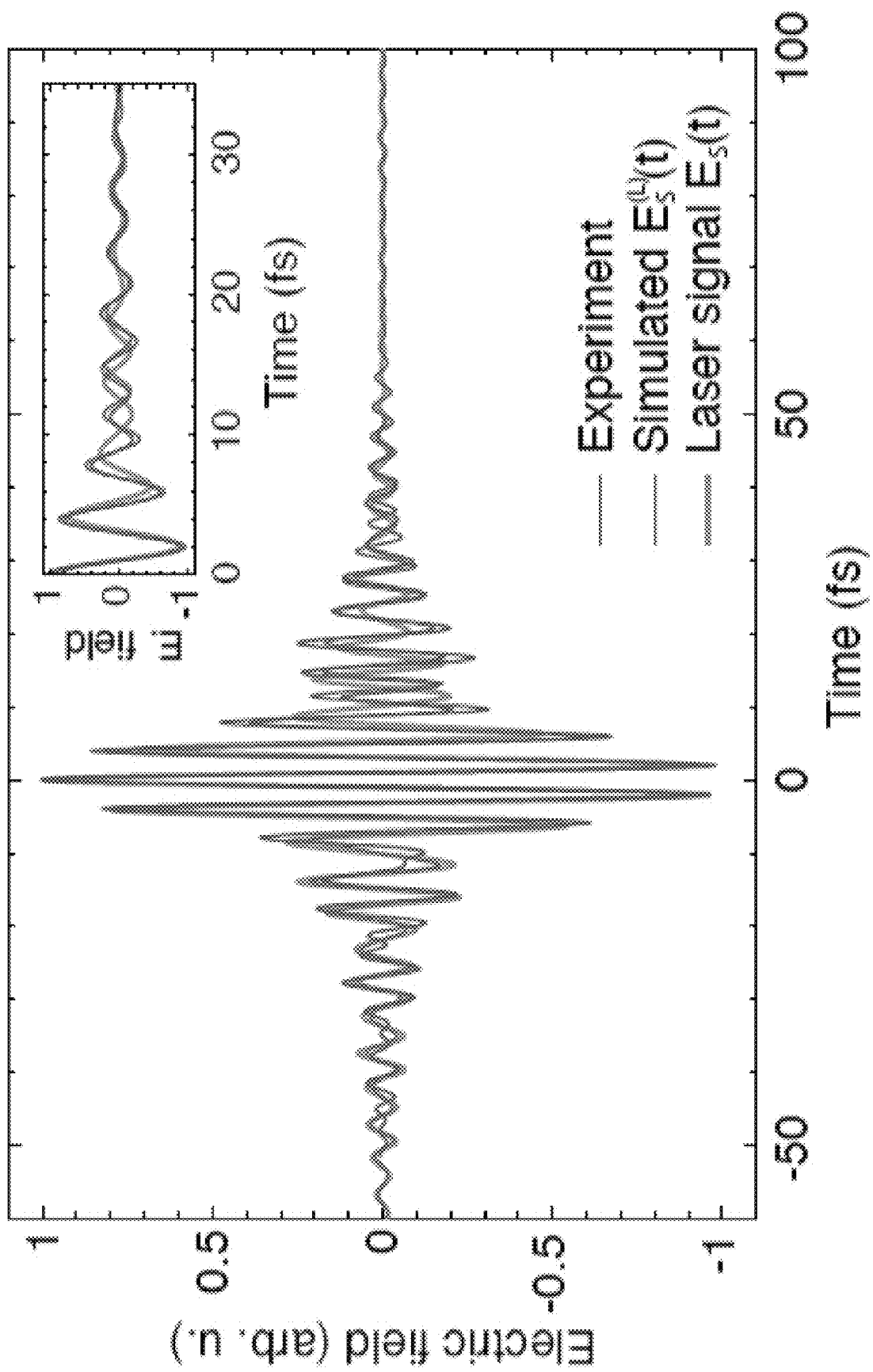

FIG. 12A illustrates experimental results of the time-domain. In the time-domain, negative delays indicate the driver pulse arrives before the signal pulse.

Figure 12B:
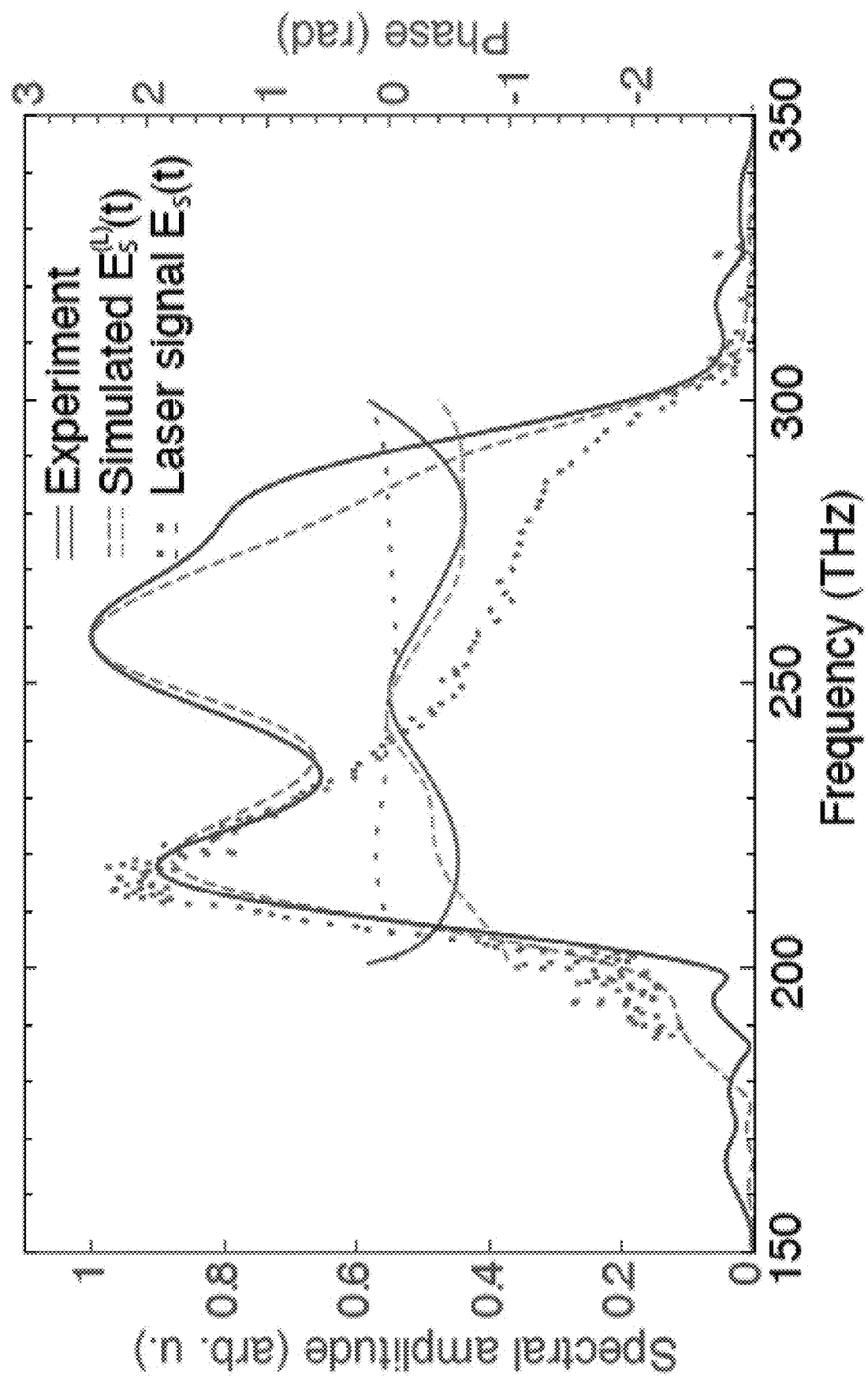

FIG. 12B illustrates experimental results of the frequency-domain results comparing simulated, measured, and calculated near-fields for devices with a 240 nm height. This on-resonant 240 nm device shows two peaks present in the cross-correlation data, one corresponding to the output laser spectrum (at 218 THz) and the other to the plasmonic enhancement of the antenna (at 257 THz). The plasmonic enhancement presents as a dephasing in the time-domain as evident in the inset of FIG. 12A.

Figure 13A:
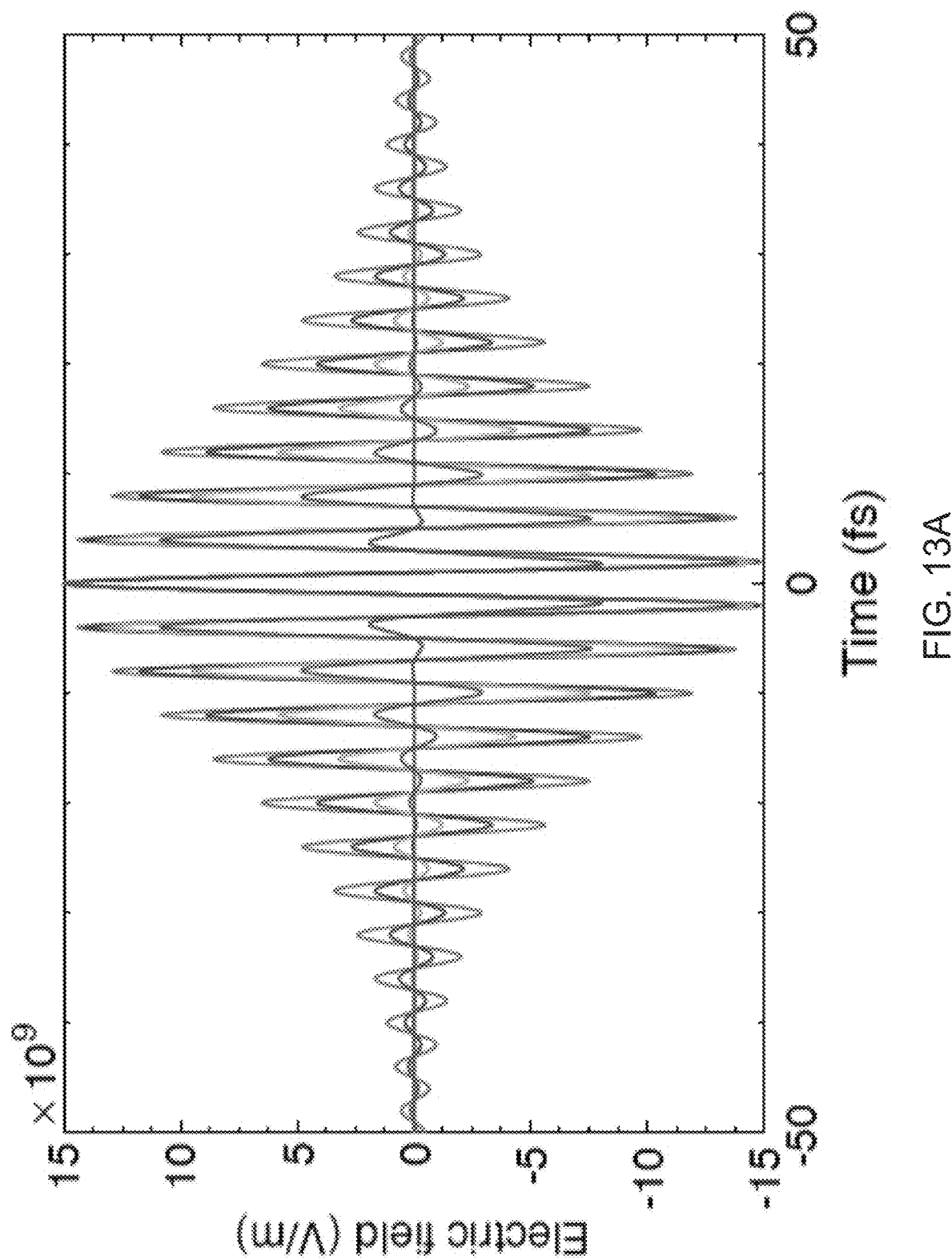

FIG. 13A illustrates the sampling bandwidth as a function of pulse duration. The Electric-field transients for near-infrared pulses with a FWHM duration of 1-, 3-, 5-, 7-, and 9-cycles and a central frequency of 250 THz.

Figure 13B:
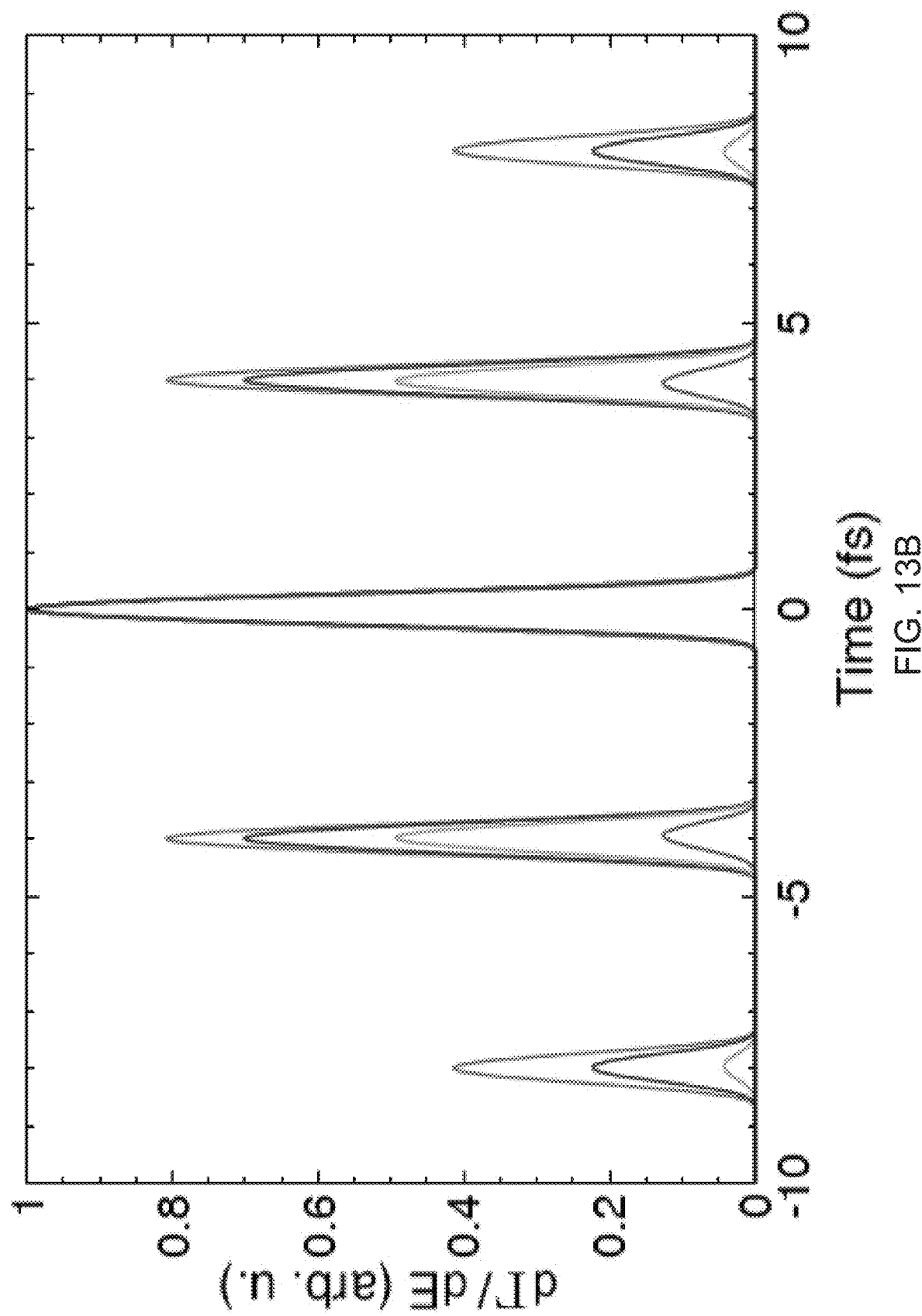

FIG. 13B illustrates the calculation of $$\frac{d\Gamma}{dE}\bigg|_{E_D(t)}$$

for the field transients shown in FIG. 13A and assuming $F_t=78.7$ V nm$^{-1}$ as the characteristic tunneling field.

Figure 13C:
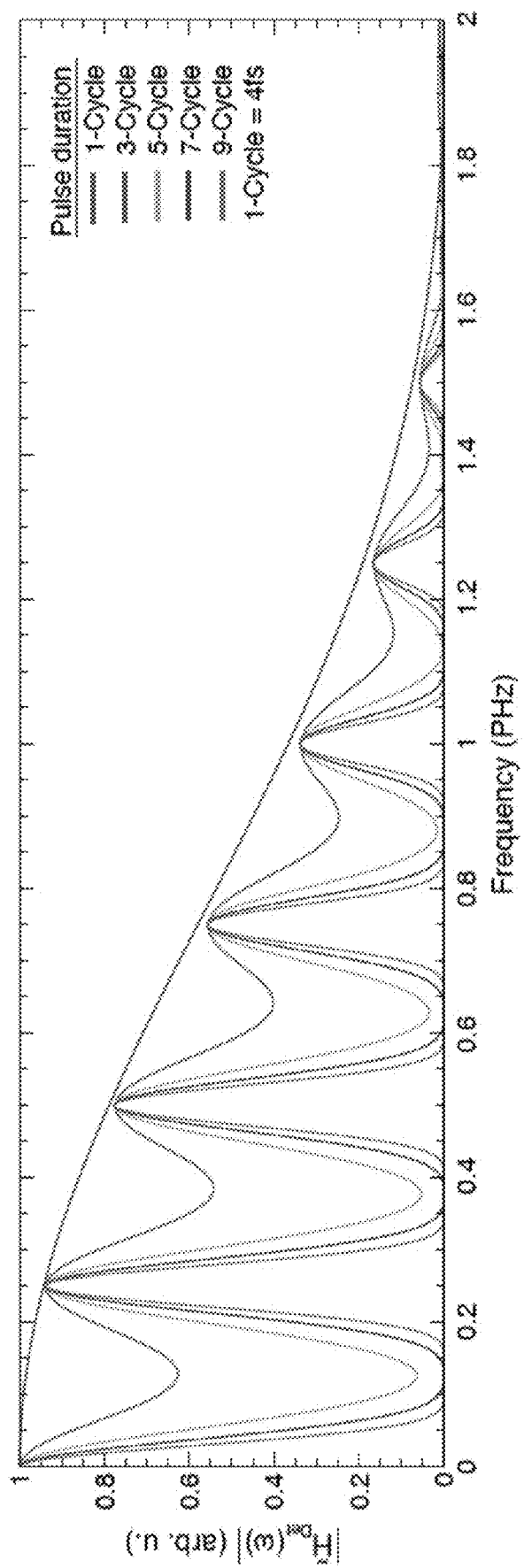

FIG. 13C illustrates the Fourier transform of $$\frac{d\Gamma}{dE}\bigg|_{E_D(t)}$$

showing the accessible sampling bandwidth provided by the field transients shown in FIG. 13A.

Figure 14A:
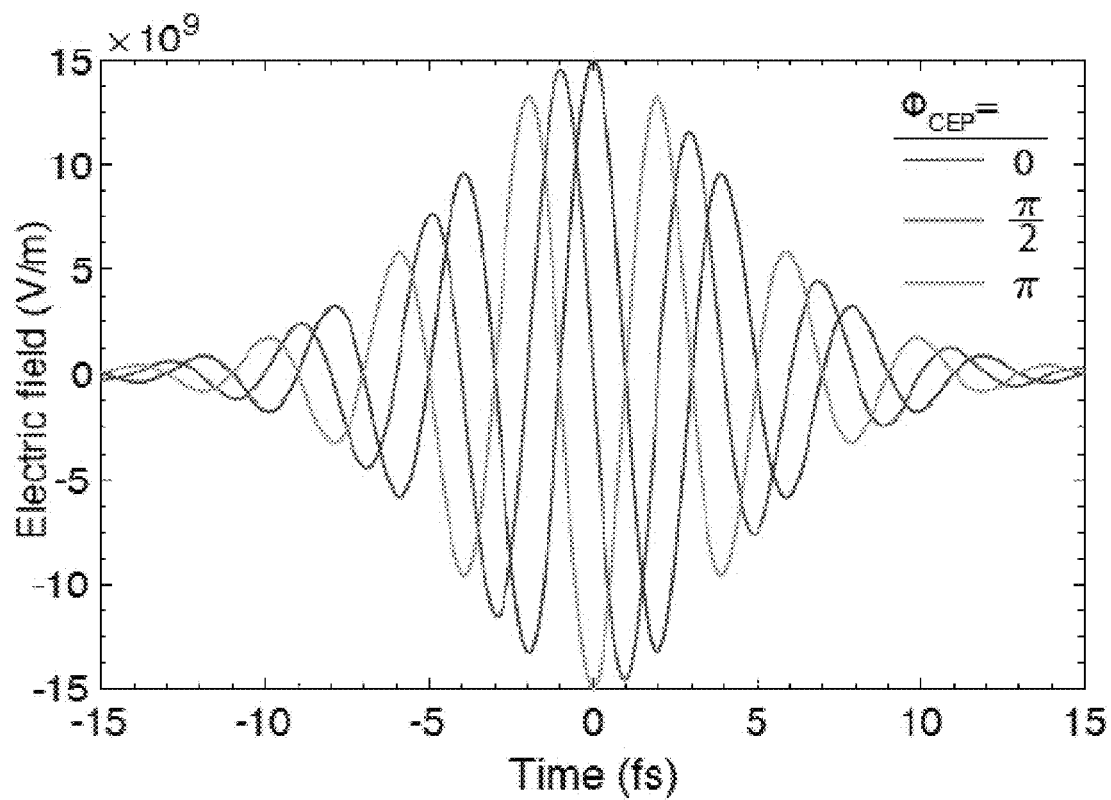

FIG. 14A illustrates the sampling response as a function of CEP. The Calculated sech$^2$ pulse centered at 250 THz with a pulse duration of 10 fs (2.5 cycle), a peak electric field of 600 MV/m, and $$\Phi_{CEP}=0, \frac{\pi}{2},$$

π.

Figure 14B:
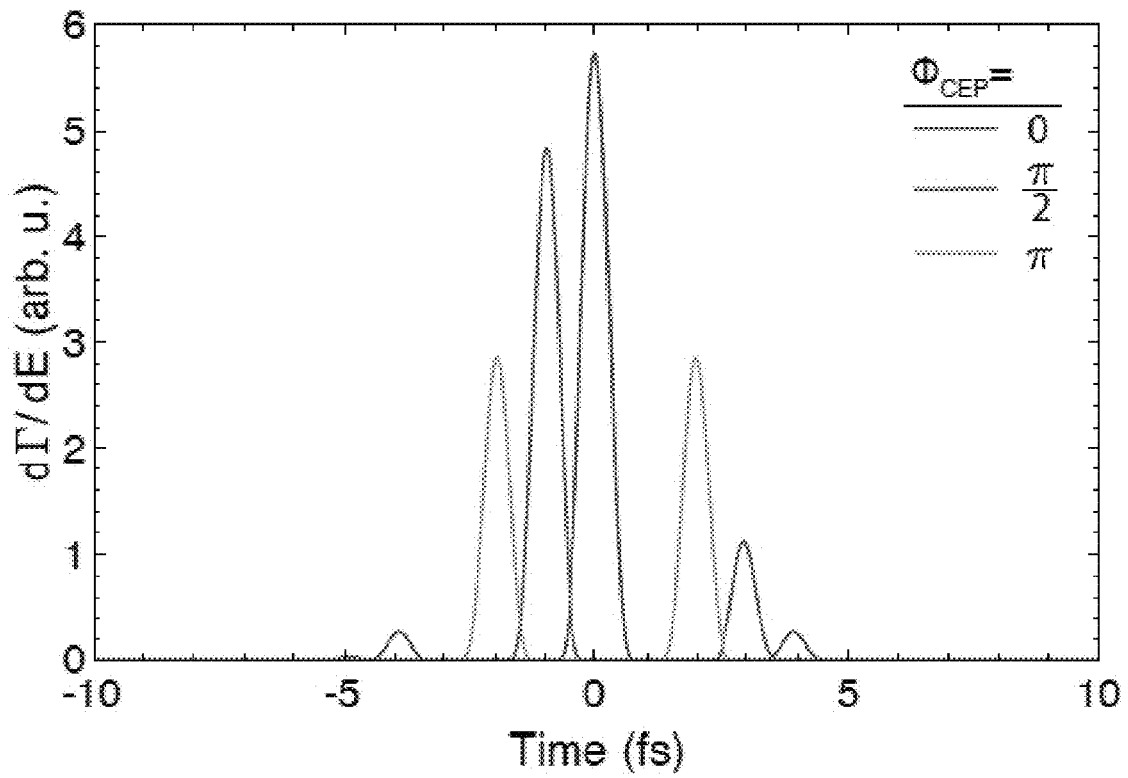

FIG. 14B illustrates the small signal gain $$\frac{d\Gamma}{dE}|_{E_D(t)},$$

which is calculated by assuming Fowler-Nordheim tunneling emission with a characteristic tunneling field of $F_t=78.7$ V nm$^{-1}$. The electric-field transients used here correspond to FIG. 14A.

Figure 14C:
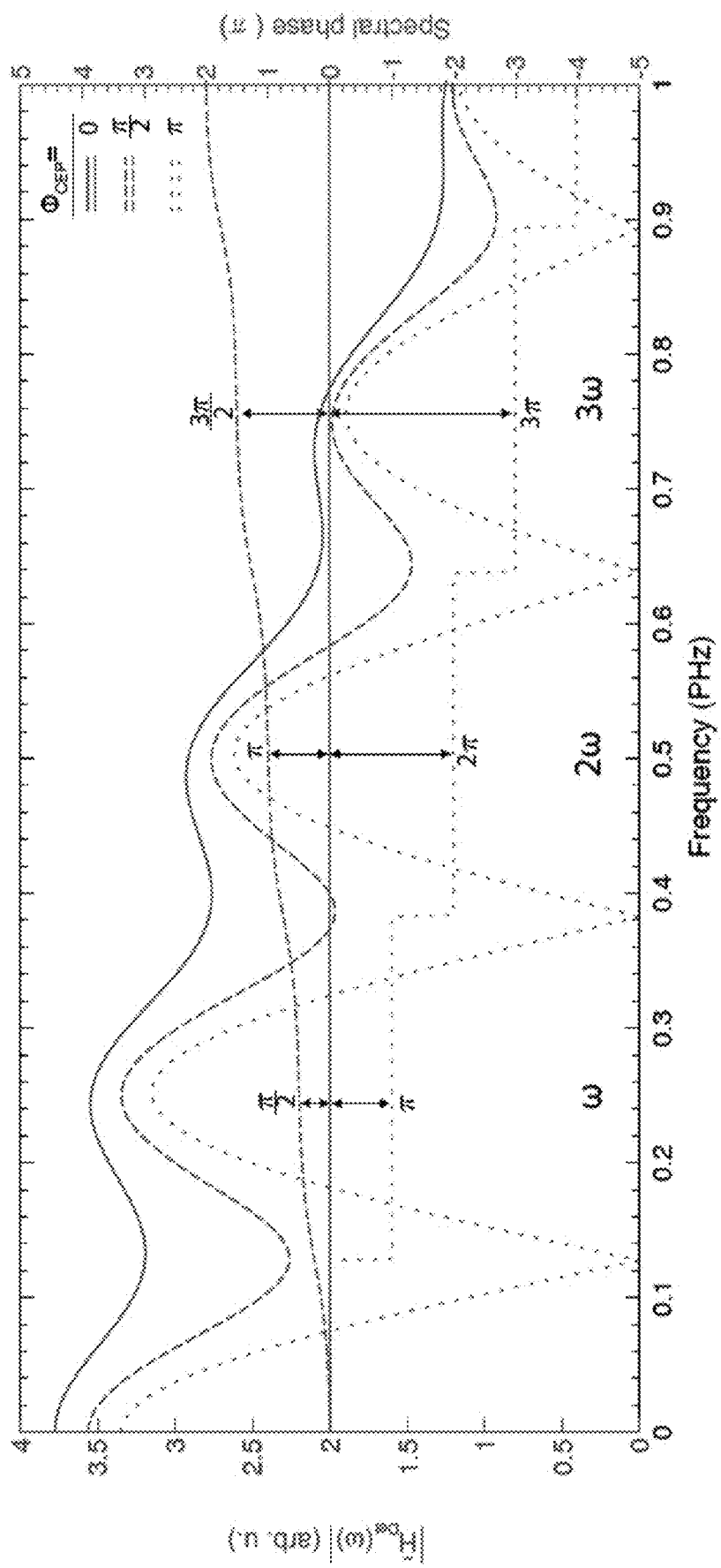

FIG. 14C illustrates the spectral amplitude and phase of the complex sampling response of $\tilde{H}_{Det}(\omega)$ as a function of frequency. Calculated for $$\Phi_{CEP} = 0, \frac{\pi}{2},$$

π.

Figure 15A:
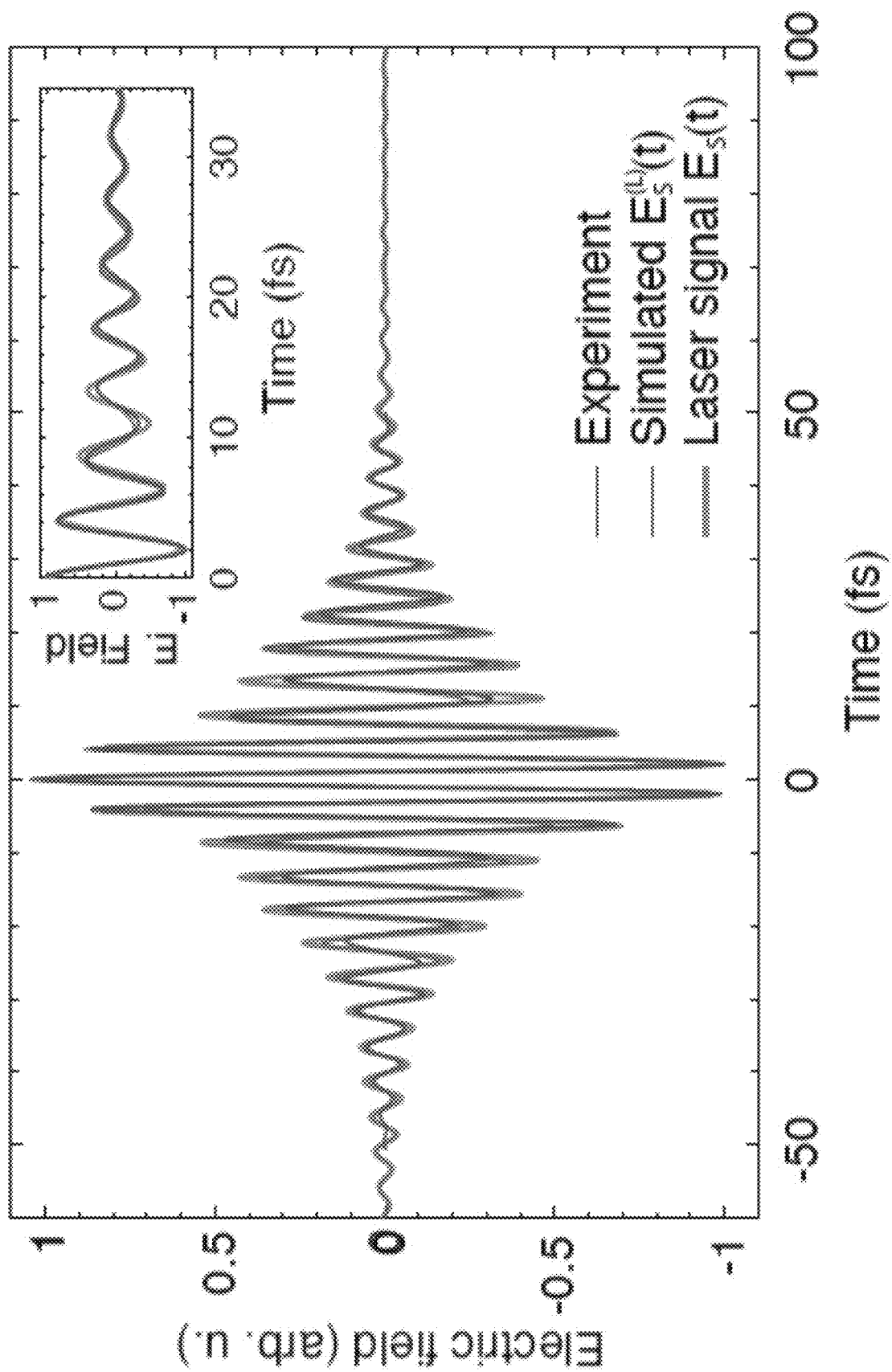

FIG. 15A illustrates the Time-domain results for the 200 nm device. In the time-domain, negative delays indicate the driver pulse arrives before the signal pulse. The 200 nm device is designed to be off-resonant with the laser pulse and the measured trace yields (blue) good agreement to the calculated laser output (grey).

Figure 15B:
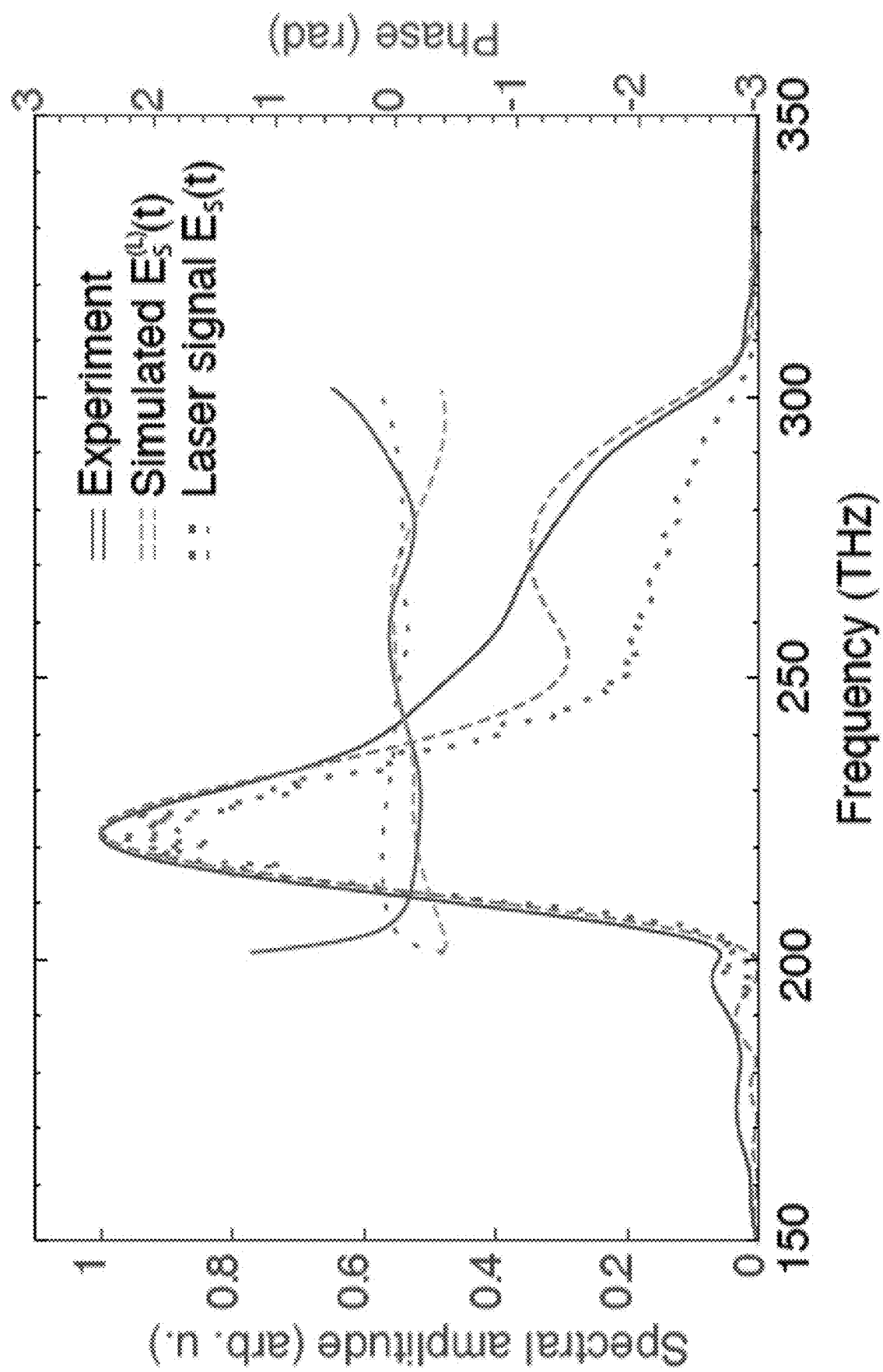

FIG. 15B illustrates the frequency-domain results for the 200 nm device comparing simulated, measured, and calculated near-fields for 200 nm devices. The 200 nm device is designed to be off-resonant with the laser pulse and the measured trace yields (blue) good agreement to the calculated laser output (grey).

Figure 16A:
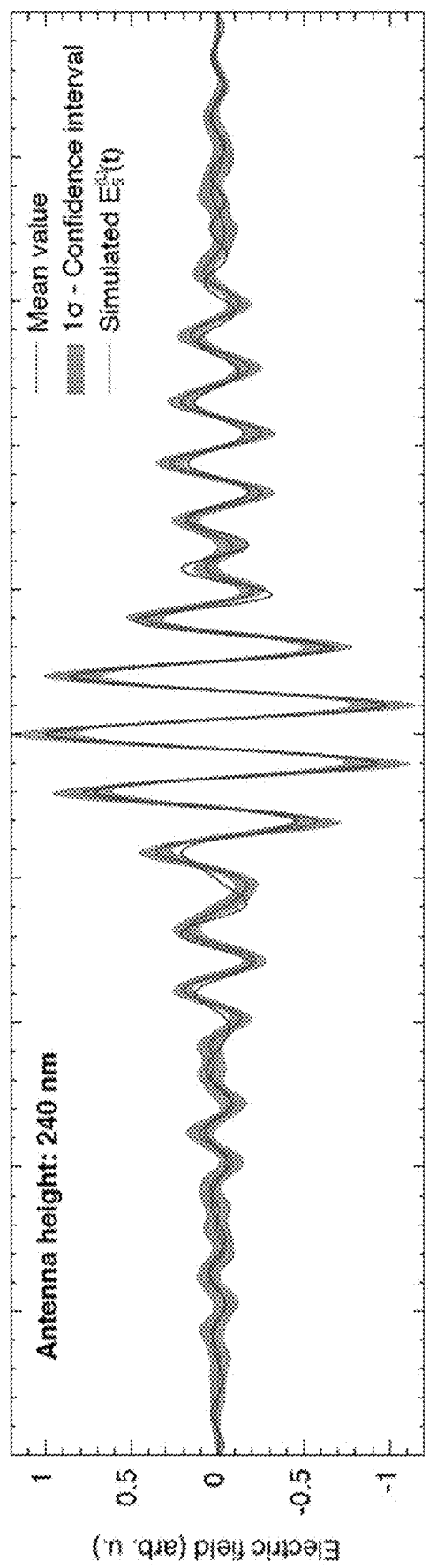

FIG. 16A illustrates the mean value and 1σ-confidence interval for the Time-domain measurement and simulation for the 240 nm devices in FIGS. 12A-12B. The blue curves show the mean value for every electric field/time coordinate over all individual scans. The grey ribbon shows the 1σ-confidence interval for the respective coordinate. For comparison, the simulated electric field is shown in purple.

Figure 16B:
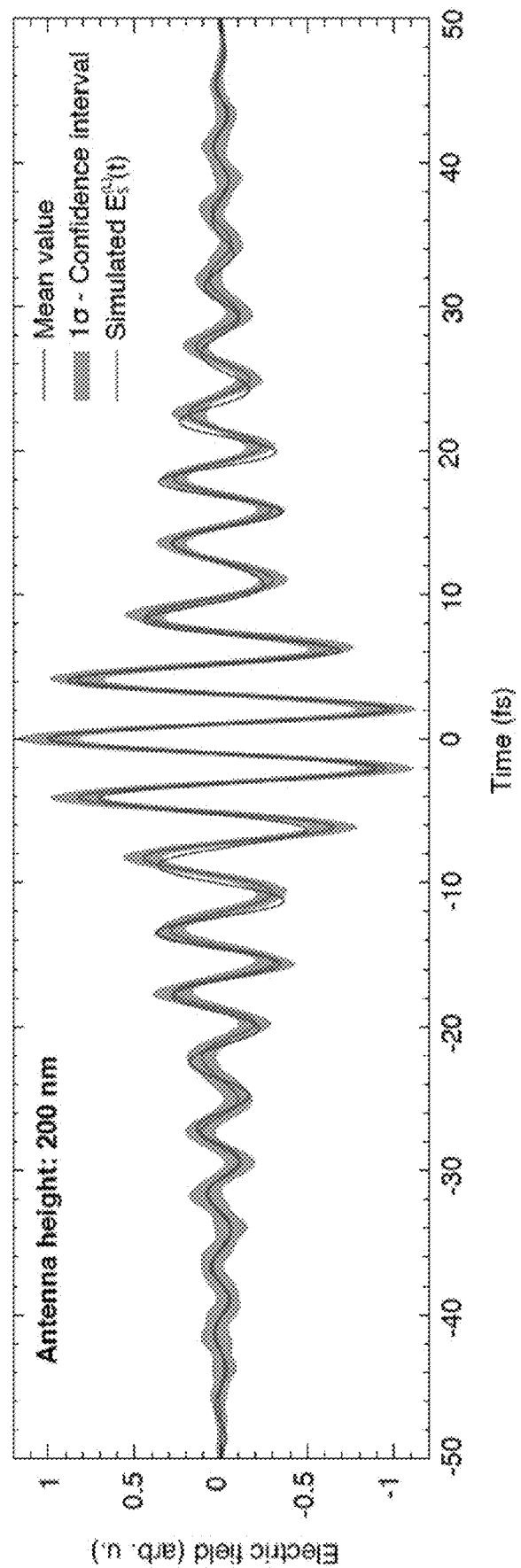

FIG. 16B illustrates the mean value and 1σ-confidence interval for the Time-domain measurement and simulation for the 200 nm devices in FIGS. 15A-15B. The blue curves show the mean value for every electric field/time coordinate over all individual scans. The grey ribbon shows the 1σ-confidence interval for the respective coordinate. For comparison, the simulated electric field is shown in purple.

Figure 17A:
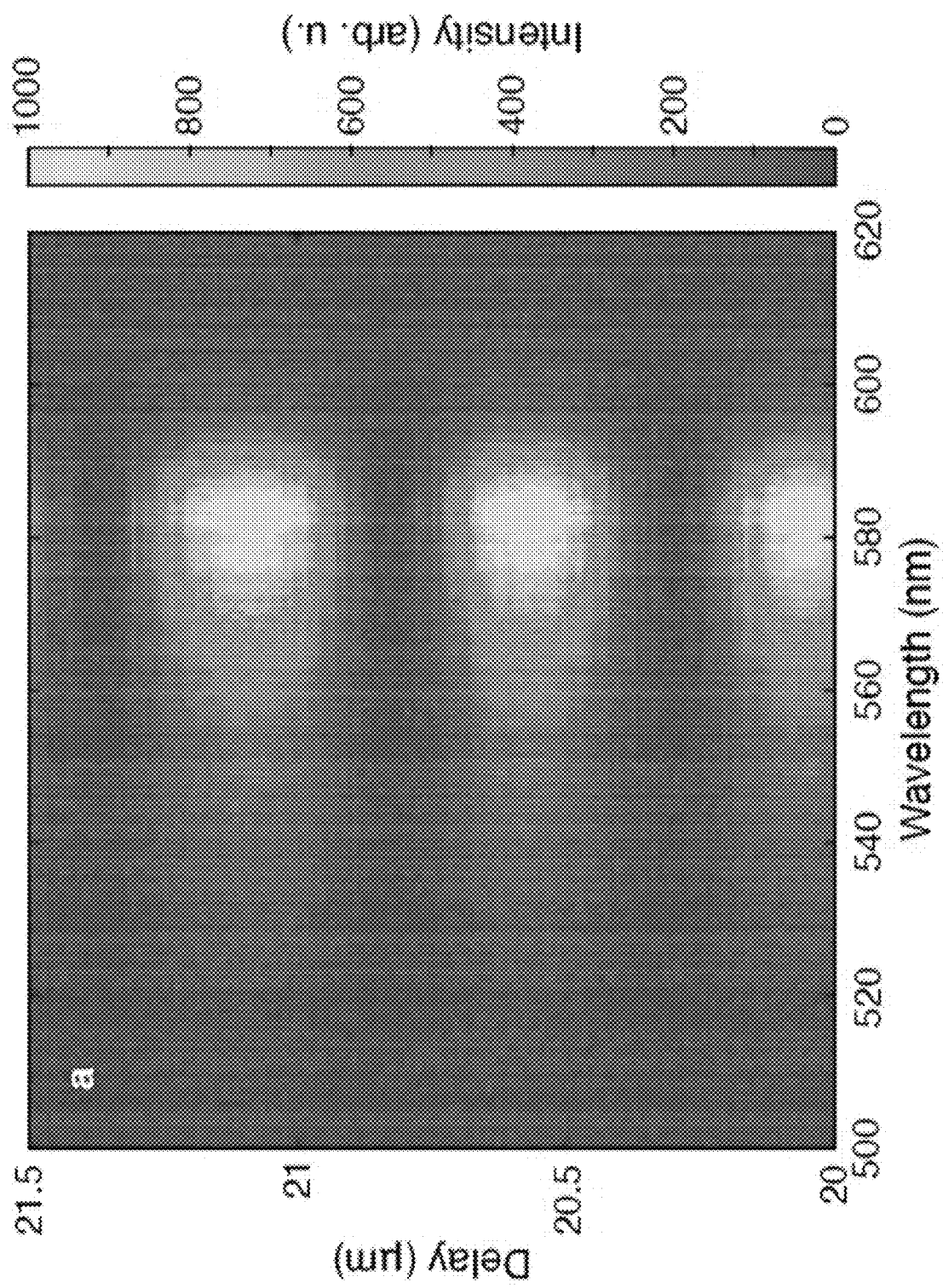

FIG. 17A illustrates 2DSI measurement for raw 2DSI spectrogram of the source in the experiment conditions.

Figure 17B:
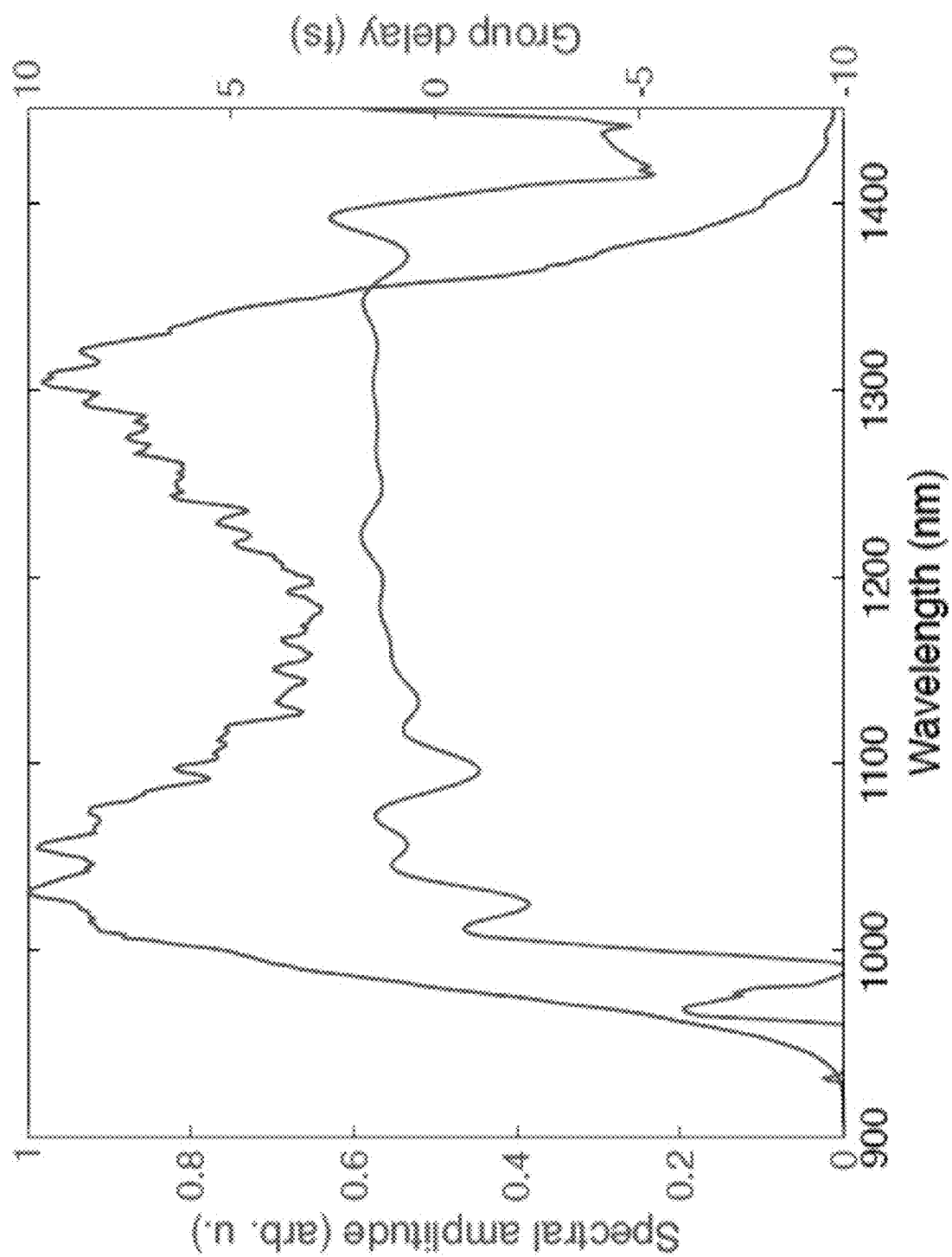

FIG. 17B illustrates the retrieved group delay (red) and laser spectrum (blue). The optimized values of shear frequency and upconversion wavelength are $f_{shear}=5.5$ THz and $\lambda_{up}=1050$ nm.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Devices and Apparatuses for Optical Sampling

Aspects disclosed herein are generally directed to an integrated optical sampling platform/apparatus useful for time-domain spectroscopy and applicable for optical sampling from the visible through the infrared portions of the electromagnetic spectrum. FIG. 1A illustrates an optical detector device 100 that includes a cathode electrode 110 as an electron source. The electrode 110 can be formed on a substrate 105 (e.g., a SiO$_2$ substrate, a BK7 glass substrate, and/or the like) as an electrically-connected, plasmonic gold nanoantenna. Generally, any suitable material can be employed that has desirable work function (since a higher work function makes it more challenging to extract electrons for tunneling) and carrier lifetime (which is a factor in response times) characteristics. The size and material of the nanoantenna can be selected to tune the plasmonic resonance and the select the most enhanced wavelength. As an example, when the nanoantenna has a height of 240 nm, base of 180 nm, and a thickness of 20 nm with a 2-3 nm chromium (Cr) adhesion layer, the resonance is at 1170 with a field enhancement of 35.

The plasmonic resonance of the nanoantenna can be useful for relatively greater field enhancement, so that lower driving pulse/energy can be employed to generate electron bursts as described herein. In some cases, the nanoantenna does not exhibit plasmonic resonance. As illustrated in FIG. 1A, the antenna electrode 110 can be generally triangular shaped, with one tip of the triangle disposed towards the anode (described next).

The device 100 also includes an anode electrode 115 formed as a gold nanowire and separated from a tip of the antenna cathode 110 by a gap such as, for example, around 50 nm that can be air, any other suitable gas, a vacuum, and/or the like. The gap can generally be about 10 nm, about 20 nm, about 50 nm, about 80 nm, about 100 nm or more, including all values and sub-ranges in between. As an example, the nanowire can be about 100 nm wide and 20 nm thick with a 2-3 nm Cr adhesion layer. The device 100 can also include a current detector 120 coupled to the electrodes 110, 115 to read out the current therebetween. While illustrated as being formed off the substrate 105, in some cases the current detector 120 can be formed on the substrate 105 instead. The current detector 120 can be any suitable detector capable of detecting sub-nA current, and can in some cases employ lock-in amplification.

During operation, a weak, free-space optical signal/pulse 125 (e.g., in the fJ range) to be detected, also sometimes referred to as an 'incident optical signal' and variants thereof, can be applied to and/or be incident on the device 100. In some cases, the signal 125 can be applied to the device 100 under ambient lighting conditions (e.g., an indoor room with overhead lighting). Generally, the signal 125 can include a set of pulses that are insufficient (e.g., a few fJ) to trigger optical-field driven tunnelling of electrons from the tip of the cathode 110 across the gap to the anode 115, and to result in a detectable current at the current detector 120. However, when a strong driving optical signal/probe signal 130 (e.g., in the pJ range, such as 50 pJ) also illuminates the device 100 in a temporally overlapping manner, a large local electric field (e.g., 1 GV/m or more) can be generated that is of sufficient magnitude to trigger tunneling of electrons via electron bursts from the tip of the cathode 110 to the anode 115 across the gap therebetween. Generally, the intensity of the incident optical signal 125 can be at most about $\frac{1}{100000}^{th}$, about $\frac{1}{10000}^{th}$, about $\frac{1}{1000}^{th}$ or more of an intensity of the driving optical signal 130, including all values and sub-ranges in between. In some cases, the photon energy and/or wavelength of the driving signal 130 can be selected based on a work function of a material of the antenna electrode 110, to ensure that the driving signal 130 does not result in linear photoemission from the electrode 110. In other cases, when the photon energy and/or wavelength of the driving signal 130 is predetermined such as, for example, when the device 100 is specifically designed for detection of a particular incident optical signal, the material of the antenna cathode 110 and the anode 115 can be selected to ensure nonlinear photoemission at the predetermined intensity of the driving optical signal.

This resulting photocurrent is detectable by the current detector 120. Said another way, when the magnitude of the local electric field exceeds a predetermined threshold, the photocurrent tunnels across the gap and becomes detectable. It follows that the gap/separation between the tip of the cathode 110 and the anode 115 can be selected such that, in the absence of the driving signal 130, in the presence of ambient light, and even in the presence of the incident signal 125 alone, the resulting local electric field is insufficient to result in tunneling of electrons across the gap.

The incident signal 125, while being too weak to trigger tunneling itself, nevertheless can modulate the electron bursts, an impact that can be measured via the detected photocurrent, and in turn employed for detection of the incident signal 125. Said another way, the device 100 can generates a rectifying, diode-like current response to the electric fields of the signals 125, 130.

Figure 1C:
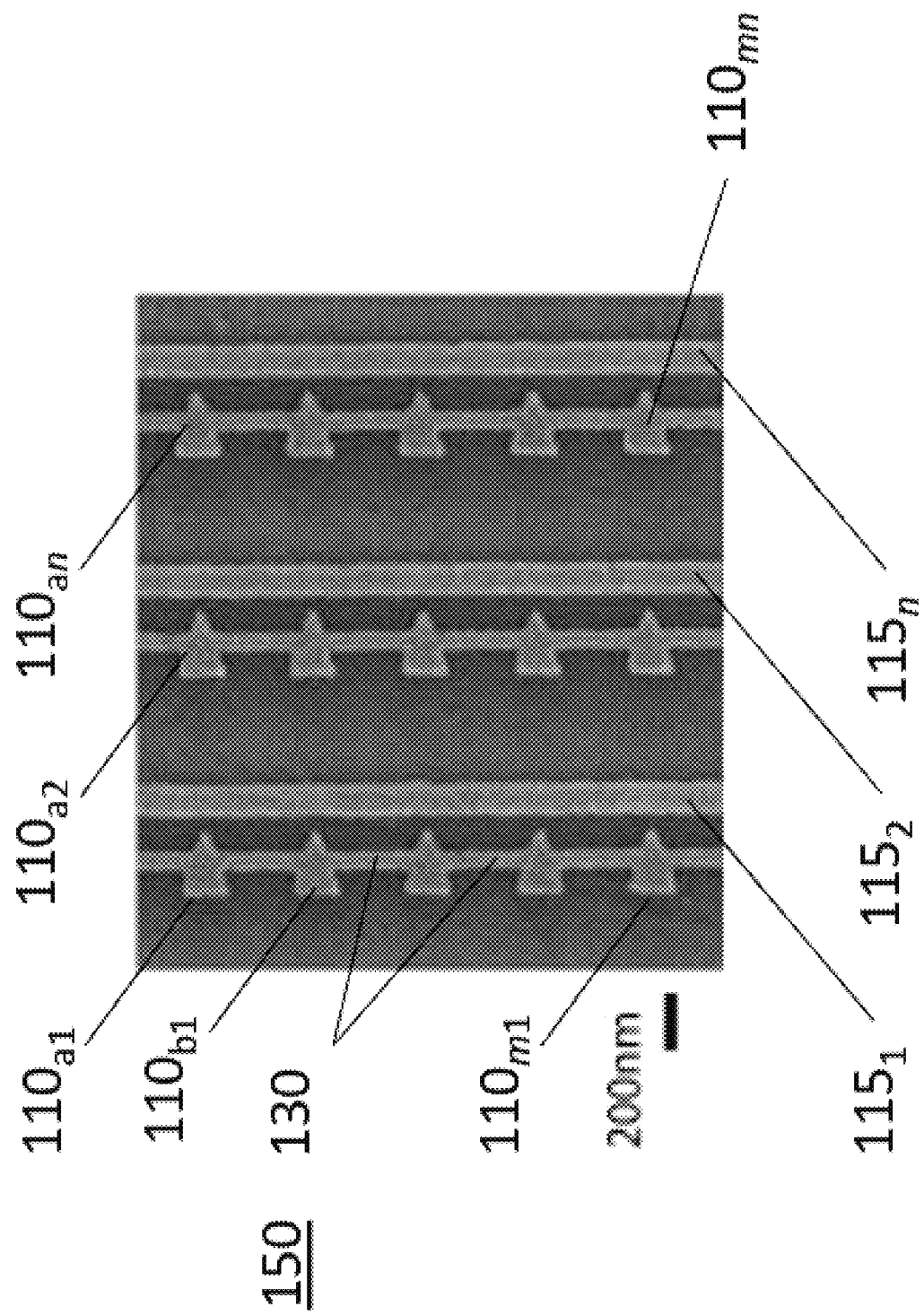

FIG. 1B illustrates sampling apparatus 150 that includes an array of multiples of the optical detector device 100 formed on a single substrate (not shown). In some cases, the size of the array (i.e., the number of devices 100) can be selected based on the spot area of the driving signal, described below. FIG. 1C illustrates a scanning electron micrograph of a fabricated sampling apparatus 150. The apparatus 150 includes cathode electrodes $110_{a1}$-$110_{mn}$ that can be formed as sets/groups of cathodes on a substrate. Each group of cathodes, such as the cathodes $110_{a1}$-$110_{m1}$, can be electrically coupled to each other by interconnecting leads 135, illustrated here as being about 50 nm wide, 20 nm thick, and spaced from each by about 400 nm in FIG. 1C. The cathodes $110_{a1}$-$110_{m1}$ can be associated with a corresponding, single anode $110_{a1}$, such that a group of cathodes and their corresponding anode resemble a set/group of the devices 100 connected in series. In this manner, the apparatus 150 includes n groups of cathodes and n nanowires as illustrated (here, m=25, n=32). Further, the different groups of devices 100 can be connected in parallel as illustrated, and all collectively coupled to a current detector 120 thought it is understood that other detector formats and layouts such as, for example, a charge coupled detector (CCD), can be employed, which in turn can be useful for spatially resolved detection. In this manner, all the devices 100 of the apparatus 150 can be simultaneously excited and read, to improve sensitivity of detection and detected signal strength. In some cases (not shown), the apparatus 100 can include or be coupled to a bias circuit that can be used to apply a bias voltage, or bias current, or both, to the devices 100 of the apparatus. The bias bends the potential barrier between the anode and the cathode, bringing the cathode tips almost to the point of emission, such that even a small signal can result in emission. This can improve sensitivity of the detection of the integrated photocurrent by the detector 120.

In a manner similar to that described for FIG. 1A, the driving signal 130 can impinge on a surface of the apparatus 150 to illuminate one or more of the devices 100 of the apparatus. In some cases, the driving signal 130 can generally define a spot area (e.g., a circular spot having a spot radius/diameter) on the surface of the apparatus 150 such as, for example, an area where the intensity of the driving signal is above some predetermined threshold. In some cases, the surface area covered by the set of devices 100 of the apparatus 150 can be smaller than this spot area (e.g., to ensure that the entirety of the driving signal impinges on all the devices, and allowing for some spatial error), substantially equal to this spot area, or greater than the spot area (e.g., to permit selective detection, to permit scanning of the driving signal across all devices, and/or the like). This generally results in generated of a photocurrent at each device 100, which in turn are collectively detected at the current detector 120 as an integrated photocurrent. The incident signal 125, depending on its spatial overlap with the spot area of the driving signal 130, can modulate one or more of the photocurrents generated by the devices of the apparatus, and as a result can modulate the overall, integrated photocurrent. In some cases, both the driving signal 130 and the incident signal 125 can be scanned across the surface to induce photocurrent generation in other devices 100 of the apparatus 150, and in turn increase SNR.

The driving signal 130, the incident signal 125, or both, can be free-space coupled to the apparatus 130 such as, for example, from directly above the apparatus, from directly below the apparatus (e.g., when the substrate of the apparatus is transparent to the signal(s)), or any suitable tilted angle therebetween. In some cases, at least one of the driving signal 130 and the incident signal 125 can be coupled to the apparatus 150 via transmissive coupling such as, for example, via a waveguide (see, e.g., Examples 3 and 5).

The modulation of the integrated photocurrent by the incident signal can be based on a programmable delay induced between the driving signal and the incident signal, as described next.

Theory of Operation and Example Signal Analysis

Figure 2A:
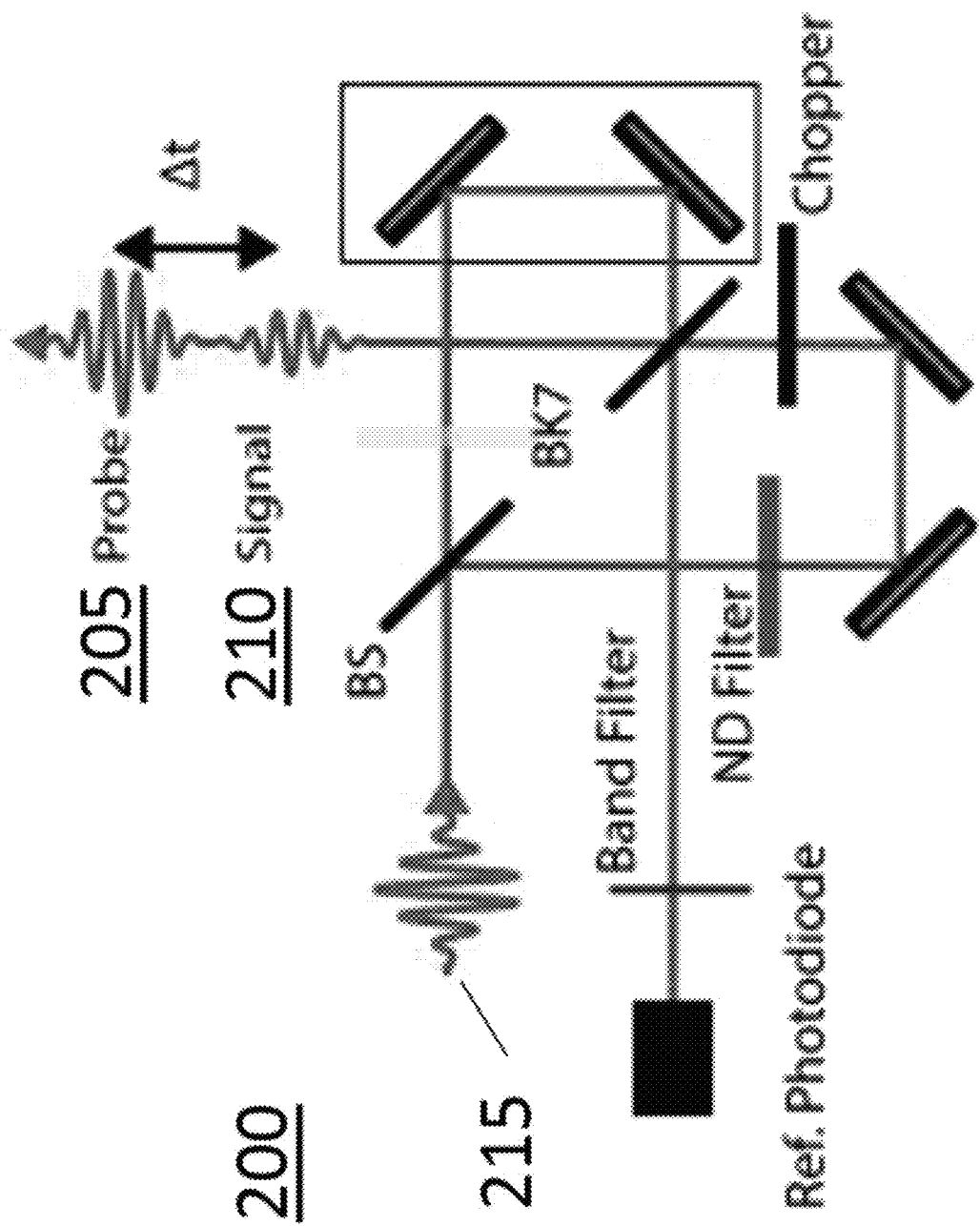
FIG. 2A illustrates a dispersion balanced Mach-Zehnder interferometer with an Inconel reflective neutral density (ND) filter of optical density (OD) 4 and an optical chopper in the signal arm.

Aspects disclosed herein are further directed to small-signal, nonlinear electric field cross-correlation techniques that are useful for petahertz-level sampling of arbitrary field transients down to 4 fJ using the apparatus 150. These techniques are based on the attosecond duration of optical-field electron emission from the devices 100 of the apparatus 150, as explained in further detail in Example 1. FIG. 2A illustrates an example apparatus 200 for generating signals for demonstrating such cross-correlation measurements. The apparatus 200 is a dispersion-balanced Mach-Zehnder interferometer that generates a pair of signals, a probe signal 205 (also sometimes referred to as a driver pulse) and an incident signal 210 (e.g., with energies of 50 pJ and 5 fJ, respectively), for application to the apparatus 150 with variable delay. A light source 215 can generally include any few cycle light source and, as an example, can include a mode-locked laser that emits a carrier envelope phase (CEP) stable, 78 MHz Er:Fiber frequency comb that is spectrally broadened in a tailored highly nonlinear germanosilicate fiber to generate the few-cycle signal 205, 210 with a duration down to 9.1 fs full-width half-maximum (fwhm). For example, a transimpedance amplifier in conjunction with lock-in amplification can be employed to detect the current generated in the device 100 as part of the current detector.

Without being limited by any theory in particular, the incident signal 210 can be retrieved by linearizing the detected nonlinear photocurrent (i.e., detectable by the current detector 120) with respect to the electric field of the probe/driver signal. The detected nonlinear correlation signal/current I(τ) from the apparatus 100 is the time integral of the nonlinear function Γ driven by the sum of the probe E(t−τ) and the small amplitude signal δE(t) (Eq. 1).

$$I(\tau) = \int_{-\infty}^{\infty} \Gamma(E(t-\tau) + \delta E(t))dt \quad (1)$$

Due to δE(t) by definition being small, the nonlinear function Γ can be Taylor expanded around the probe E(t−τ), which allows for the linearization of the correlation signal I(τ) with respect to the signal δE(t) (Eq. 2).

$$I(\tau) = \int_{-\infty}^{\infty} \left(\Gamma(E(t-\tau)) + \Gamma'(E(t-\tau)) \cdot \delta E(t) + O(\delta E(t)^2)\right)dt \quad (2)$$

Figure 2B:
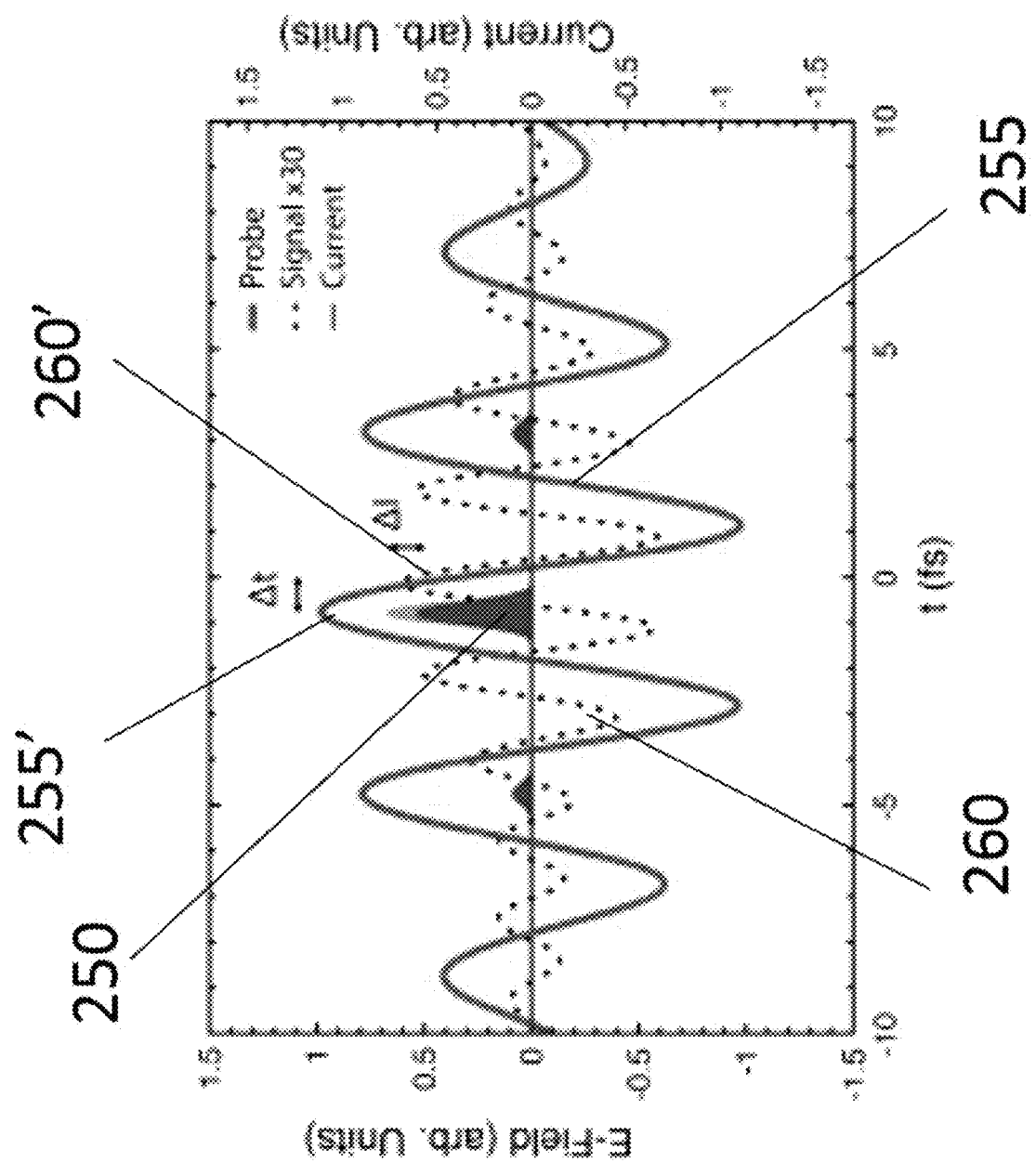
FIG. 2B is a plot depicting the photocurrent emitted at a delay Δt (shaded curves) generated by the probe pulse (solid line) together with the incident signal (dotted line) in the device of FIG. 1A.

The term in Eq. 2 related to Γ' shows that the electron bursts generated by the probe signal 205 function as a sub-cycle gate pulses. Due to the nonlinearity of the emission process, the central electron burst dominates the measured time integrated current, effectively limiting the interaction with the signal field to the duration of the central electron burst. Since the electron burst has a duration that is less than one half of the probe's cycle time (e.g. the half-cycle time for a probe of wavelength 1.2 um is 2 fs, with an estimated burst duration of 500 (as fwhm for probe fields on the order of 20 GV/m), this allows for the retrieval of signals exceeding frequencies of one petahertz. FIG. 2B shows the interaction of the sub-cycle electron burst with the signal field, and how the modulation of the measured photocurrent 250 peaks in response to a central pulse 255' of the driving optical signal 255 that overlaps with a central pulse 260' of the incident optical signal 260.

The measured current of the cross-correlation is shown in FIG. 3A, with a signal-to-noise ratio (SNR) of 250:1 after averaging over 60 scans. The Fourier transform of the measured cross-correlation trace (FIG. 3B) reveals the spectral amplitude and phase of the local electric field at the tip of the antenna 110. Comparing the spectral amplitude to that of the optical spectrum analyzer (OSA) shows a clear deviation with a new spectral feature at 255 THz. This spectral feature matches the measured resonance of the plasmon, which was found to be 247 THz using transmission spectroscopy. The plasmonic resonance generated at the tip of the antenna 110 leads to field enhancement as well as a spectral and temporal reshaping of the local electric field at the tip of the antenna, which is then one of the components that is ultimately measured. This plasmonic response is easily simulated and so can be removed in post-processing. The local field at the tip surface is enhanced near the resonance frequency, explaining the bump observed in the spectrum of the tip-sampled waveform. These measurements confirm that the sampled field is directly related to the in-situ field at the surface of the nanoantenna tip.

These results illustrate that this cross-correlation technique based on electron emission from metallic antennas can resolve electric fields in amplitude and phase with a PHz bandwidth. Measuring the behavior of the local evanescent field of the plasmon can play a role in further utilizing this platform to retrieve fJ level arbitrary waveforms. This can allow for broadband time-domain spectroscopy ranging from THz to PHz. Applications for this technique can include, but are not limited to, time-domain spectroscopy in the molecular fingerprint region or the detection of nonlinear of phenomena in solids. When the signal is well characterized this technique allows even for the full retrieval of the time domain structure of the emitted attosecond electron burst. This cross-correlation technique therefore allows accessing the realm of attosecond time-domain spectroscopy in an integrated solid-state platform with only minute pulse energies.

The signal analysis described herein can be performed using, for example, an external computing device coupleable to the current detector, an on-board processor that is coupleable to the current detector and outputs the analysis results to an on-board screen, and/or the like. In some cases, the measured current can be displayed on an oscilloscope (or any current readout device) in real time showing an exact replica of the signal pulse and the transfer function (of the device) being measured. In some cases (i.e., non-resonant devices), the transfer function may be flat, so the measured current will be an exact replica of the signal pulse.

Example 1

Time-domain sampling of arbitrary electric fields with sub-cycle resolution enables a complete time-frequency analysis of a system's response to electro-magnetic illumination. This time-frequency picture provides access to dynamic information that is not provided by absorption spectra alone and has been instrumental in improving the understanding of ultrafast light-matter inter-actions in solids that give rise to nonlinear phenomena. Furthermore, it has recently been shown that nonlinear, sub-cycle, optical-field sampling in the infrared offers superior performance compared to traditional spectroscopic methods for the characterization of biological systems. However, despite the many scientific and technological motivations, time-domain, sub-cycle, optical-field sampling systems operating in the visible to near-infrared spectral regions are seldom accessible, requiring large driving pulse energies, and accordingly, large laser amplifier systems, bulky apparatuses, and vacuum environments. Herein, an all-on-chip, optoelectronic device capable of sampling arbitrary, low-energy, near-infrared waveforms under ambient conditions is demonstrated. The solid-state integrated detector uses optical-field-driven electron emission from resonant nanoantennas to achieve petahertz-level switching speeds by generating on-chip attosecond electron bursts. These bursts are then used to probe the electric field of weak optical transients. The devices herein are demonstrated by sampling the electric field of a ~5 fJ (0.0064 GV m-1), broadband near-infrared ultrafast laser pulse using a ~50 pJ (0.64 GV m-1) near-infrared driving pulse. The sampling measurements recovered the weak optical transient as well as localized plasmonic dynamics of the emitting nanoantennas in situ. This field-sampling device—with its compact footprint and low pulse-energy requirements—offers opportunities in a variety of applications, including: broadband time-domain spectroscopy in the molecular fingerprint region, time-domain analysis of nonlinear phenomena, and detailed studies of strong-field light-matter interactions.

Complimentary time-frequency analysis offered by time-domain sampling is critical to the understanding and design of electronic systems, and such studies have revolutionized spectroscopy in the terahertz spectral region. Commercial THz time-domain spectroscopy systems are now readily available and are often used for industrial applications, such as chemical and material analysis. Sub-cycle field sampling in the THz regime has also been instrumental to many fundamental scientific investigations, including the tracing of electron wavepacket dynamics in quantum wells, the investigation of dynamic Bloch oscillations in semiconductor systems, and the observation and characterization of quantum vacuum fluctuations.

Optical-field sampling in the visible to near-infrared (near-IR) spectral regions would provide great benefit to both science and industry. For example, attosecond streaking spectroscopy has been used to study the role of optical-field-controlled coherent electron dynamics in the control of chemical reaction pathways and the investigation of petahertz-level electrical currents in solid-state systems. It was also recently shown that sub-cycle field sampling of the near-infrared free-induction decays of biological systems can provide an order of magnitude improvement in selectivity and reduced limits of detection compared to traditional frequency-domain spectroscopic methods. Despite these compelling results, scaling such techniques into the near-IR and visible spectral regions has remained challenging. Manipulation of short electron wave packets and attosecond streaking in the visible to near-IR spectral regions have proven to be viable paths towards direct optical-field sampling in the time-domain; however, these techniques require high-energy optical sources and a complicated optical apparatus, with no compact and integratable sampling technology with the bandwidth and field sensitivity required for real-world applications of interest.

To address this lack of compact and integratable tools for optical-field sampling in the visible to near-IR, an on-chip, time-domain, sampling technique for measuring arbitrary electric fields of few-fJ optical pulses in ambient conditions has been developed and demonstrated. The strong local electric field surrounding plasmonic nanostructures has been used to generate strong electric fields in nanometer sized volumes creating a new regime for exploring attosecond science. The work herein leverages the sub-cycle optical-field emission from plasmonic nanoantennas to achieve petahertz-level sampling bandwidths using only picojoules of energy. Furthermore, by electrically connecting the nanoantenna arrays via nanoscale wires, the field samplers demonstrated here are amenable to large-scale electronic integration. Beyond demonstrating the feasibility of sub-cycle field sampling of petahertz-scale frequencies, the results also reveal in situ dynamical properties of the interaction of the driving optical-field waveform with the plasmonic nanoantennas. This work will enable the development of new tools for optical metrology that will complement traditional spectroscopic methods and unravel linear and nonlinear light-matter interactions as they occur at their natural time and length scales.

The device of Example 1 is depicted in FIG. 10A. It consists of an electrically-connected plasmonic gold nanoantenna that functions as the electron source (cathode), a gold nanowire as an anode separated by a 50 nm air gap, and an external current detector. A photograph of the nanocircuit integrated onto a printed circuit board is shown in FIG. 10C. Devices were connected in parallel via nanowires and simultaneously excited to improve signal strength. A scanning electron micrograph (SEM) of the fabricated devices is shown in FIG. 10D. When the strong driving pulse $E_D(t)$ illuminates the nanoantenna/wire junction, a large local electric field $E_D^{(L)}(t)$ is generated at the nanoantenna tip as shown in FIG. 10E. The incident electric field is related to the local electric field by the transfer function of the nanoantenna $\tilde{H}_{PL}(\omega)$ by the relationship $E_D^{(L)}(t) = \mathcal{F}^{-1}(\tilde{H}_{PL}(\omega) \cdot \tilde{E}_D(\omega))$, where $F^{-1}$ is the inverse Fourier transform. Due to the combined effect of the localized surface plasmon polariton in the antenna and the geometric field enhancement resulting from the sharp radius of curvature, the locally-enhanced field exceeds the incident electric field of the driver pulse by a factor of ~35. The weak incident signal field $E_S(t)$ then creates a weak local signal field $E_S^{(L)}(t)$ that modulates the average photocurrent, $I(\tau)$, as a function of delay, $\tau$, between the two pulses from which the local signal field can be measured (FIG. 10B). The local signal field itself is too weak to drive photoemission, and thus it only modulates the electron burst(s) emitted by the local driver field.

If sufficiently strong, the local driving electric field at the antenna tip $E_D^{(L)}(t)$ significantly bends the surface potential, resulting in optical-field-driven tunneling of electrons at the metal-vacuum interface once every cycle. The instantaneous emission rate $\Gamma$ has been described previously, and it approaches the static tunneling emission rate defined by the following equation:

$$\Gamma(E) \propto E^2 \cdot \exp^{-\frac{F_t}{|E|}}.$$

The characteristic tunneling field strength $F_t = 78.7$ V nm$^{-1}$ is dependent on the work function of the metal, approximately 5.1 eV for gold. Due to the strong nonlinearity of the emission process, the electron bursts generated in the device are deeply sub-cycle and on the order of several hundred attoseconds for the case of near-IR fields.

For calculating impact of the weak signal field on the total emission, a linearized small-signal model can be used. The addition of the weak local signal $E_S^{(L)}(t)$ is considered as a function of delay, $\tau$, relative to the strong driving field $E_D^{(L)}(t-\tau)$ as shown in FIG. 10B. A short optical driving pulse in combination with a highly-nonlinear, sub-cycle emission process allows for field-resolved sampling of the signal pulse. In this case, the detected average current as a function of delay $I(\tau)$ is the time integral of the nonlinear emission rate $\Gamma$ driven by the sum of the driver field $E_S^{(L)}(t)$ and the small-amplitude signal field $E_D^{(L)}(t-\tau)$.

$$I(\tau) = \int_{-\infty}^{\infty} \Gamma(E_D^{(L)}(t-\tau) + E_S^{(L)}(t)) dt. \quad (3)$$

Given that $E_S^{(L)}(t)$ is sufficiently small, one can Taylor-expand $\Gamma$ around the local driver field $E_D^{(L)}(t-\tau)$ to the first order. This enables the linearization of the measured emission $I(\tau)$ with respect to the signal $E_S^{(L)}(t)$.

$$I(\tau) \approx \int_{-\infty}^{\infty} \left( \Gamma(E_D^{(L)}(t-\tau)) + \frac{d\Gamma}{dE}\bigg|_{E_D^{(L)}(t-\tau)} \cdot E_S^{(L)}(t) \right) dt. \quad (4)$$

The second term in Eq. 4 is a cross-correlation between $$\frac{d\Gamma}{dE}\bigg|_{E_D^{(L)}(t-\tau)}$$

and $E_S^{(L)}(t)$, and de-noted as $I_{CC}(\tau)$. Due to the nonlinearity of the emission process, the central most portion of the driving waveform dominates the measured time-integrated current and acts a sub-cycle gate limiting interaction with the signal field (FIG. 11A inset). This fact becomes more evident by taking the Fourier transform of $I_{CC}(\tau)$, which simplifies to the following expression:

$$\tilde{I}_{CC}(\omega) = \mathcal{F}\left(\frac{d\Gamma}{dE}\bigg|_{E_D^{(L)}(t)}\right)^* \cdot \tilde{E}_S^{(L)}(\omega), \quad (5)$$

where $$\mathcal{F}\left(\frac{d\Gamma}{dE}\bigg|_{E_D^{(L)}(t)}\right)^*$$

is the complex spectrum shown in FIG. 11A and is denoted as $\tilde{H}_{Det}(\omega)$ This function $\tilde{I}_{CC}(\omega)$ describes the full sampling response to the weak signal and is connected to the measured cross-correlation in the time-domain $I_{CC}(t)$ by a Fourier transform.

The accessible bandwidth is found through the multiplication of the initial small signal $\tilde{E}_S^{(L)}(\omega)$ with $\tilde{H}_{Det}(\omega)$ Due to the highly-nonlinear sub-cycle response of the emission rate on the driving electric field, $\tilde{H}_{Det}(\omega)$ spans several octaves from DC to more than 1 PHz (see FIG. 11A). The resultant small-signal gain enhances the response of the system to weak signals of interest $\tilde{E}_S^{(L)}(\omega)$ that would not be able to generate detectable electron emission signals on their own. The periodic structure in the plot of $\tilde{H}_{Det}(\omega)$ is shown in FIG. 11A. This structure is due to the presence of regularly spaced electron pulses in the time domain, which result in the modulation of the amplitude of $\tilde{H}_{Det}(\omega)$ (see inset of FIG. 11A). These pulses are spaced by one cycle of the driving laser and change in number and strength depending on the carrier-envelop phase (CEP); however, for few-cycle pulses, such as those used in Example 1, the response remains relatively flat over the bandwidth of the driving pulse and is only minimally affected by the modulation. More detailed discussion of CEP and pulse duration effects can be found in the Discussion of Sampling Bandwidth and Carrier-Envelope Phase Discussion sections.

There are several practical considerations for sampling either the local or incident signal fields. The impulse response function of the antenna, specifically the resonant plasmonic contribution, redistributes frequency components as shown by the field enhancement as a function of frequency in FIG. 11B. Considering the actual sampling process, the limiting factors are the satellite electron pulses, which, if too pronounced, can cause stronger modulation of the sampling bandwidth, and the breakdown of the theoretical approximations mentioned above (see Discussion of Sampling Bandwidth). If the intensity of the probed weak signal pulse is comparatively strong, approximately three orders of magnitude below the driving pulse and higher, it will result in nonlinear distortions causing higher order terms in the cross-correlation to become significant. Another important limitation is the work function of gold. If the signal pulse reaches photon energies higher than the work function, linear photoemission due to single-photon absorption will cause a substantial background current. This places an upper frequency limit of a gold device near 1 PHz.

To experimentally verify the device performance, a CEP-stable, 78 MHz Er:fiber-based laser source was used. The pulses were spectrally broadened in a highly non-linear fiber to create a pulse duration down to approximately 10 fs full-width at half-maximum (FWHM) (~2.5 cycles) at a central wavelength of ~1170 nm. Pulse characterization of the laser source was performed using Two-Dimensional Spectral Shearing Interferometry (2DSI) and can be found in the 2DSI Measurement section. These pulses were locked to a fixed CEP value for all measurements. A dispersion balanced Mach-Zehnder interferometer was used to generate pairs of strong driver and weak signal pulses with a variable delay for the experiment. The driver and signal pulse energies (fields) were measured to be approximately 50 pJ (0.64 GV mat focus) and ~5 fJ (0.0064 GV m$^{-1}$ at focus) respectively. The two pulses were focused to a spot-size of 2.25 µm×4.1 µm FWHM, illuminating 10-15 nanoantennas at a time. The pulses were linearly polarized along the height axis of the nanoantennas (FIG. 10A). Attosecond electron bursts were primarily generated in the nanocircuit by the 50 pJ driver pulse, with the emission modulated by the ~5 fJ signal pulse as the delay between the two pulses was scanned. The signal pulses, with an intensity of 1×10$^{-4}$ that of the drive pulses, were much too weak to drive electron emission on their own. The photocurrent was then detected using a transimpedance amplifier in conjunction with lock-in detection. The experiment was performed in ambient conditions (i.e. in air and at room temperature). This ability to function in ambient conditions is enabled by the small gap size between the nanoantenna and the collecting wire. A schematic of the experiment is shown in FIG. 10A and further details can be found in the Methods section.

FIG. 12A presents the measured cross-correlation (blue trace) for the tested antennas with a 240 nm height (from antenna base to tip, see FIG. 10A), and compares them with the computed simulated antenna response $E_S^{(L)}(t)$ (red trace) and the calculated laser signal $E_S(t)$ (grey trace). The calculated laser signal $E_S(t)$ was found by applying the measured spectral phase (see 2DSI Measurement section) of the laser output to the measured intensity spectrum before converting back to the time domain. The measured trace (blue) shows significant deviations from the calculated laser output (grey) especially in the pedestal from 5 fs to 20 fs, during which the laser output is almost 180° out of phase with the measured trace from 8 fs to 16 fs (FIG. 12A inset). In the frequency-domain (FIG. 12B), two prominent maxima are visible in the Fourier transform of the measured data (blue solid trace). These maxima are also exhibited in the simulation of the antenna response (light blue dashed trace), but only one (at 218 THz) is observed in the measured laser spectrum (grey dotted trace). The second peak (at 257 Thz) is due to the plasmonic response of the antenna ($\tilde{H}_{PL}(\omega)$) and must be incorporated when calculating the electric near-field. The peak in the spectral phase of the measured data (red solid trace) is due to the plasmonic resonance of the antenna and closely matches the simulation of the antenna response (orange dashed trace). When including the plasmonic response, the measured pulse shape in the time domain (FIG. 12A, blue trace) is almost identical to the simulated antenna response, $E_S^{(L)}(t)$ time domain (FIG. 12A, blue trace) is almost identical to the simulated antenna response, $E^{(L)}(t)$ (red trace) and includes the strong 180° dephasing near 12 fs with respect to the calculated laser output (grey trace, see FIG. 12A inset). Similar dephasing dynamics have been investigated previously in both nanoantenna and extended nanotip structures and are a hallmark of the resonant electron dynamics excited within the nanoantennas. Experimental results and simulations for 200 nm devices can be found in Field-Sampling Measurements with 200 nm Devices section.

The minor discrepancies between the simulated and experimental data are attributed to the multiplexed nature of the current detection and minor uncertainties in the fabrication process which were not accounted for in the Example 1 models. As 10-15 nanoantennas were illuminated at a time, the measurements shown are an averaged trace, with all antennas contributing simultaneously to the detected current. This averaging causes the detected resonance shape to be a superposition of all antenna resonances. Another possible cause of slight discrepancy is the high malleability of gold, which can allow the antennas to reshape under intense radiation, thereby creating a geometry that differs from the original shape just after fabrication.

The detection scheme can be directly compared to hetero- and homodyne methods that are often used in techniques such as frequency-comb spectroscopy. In fact, the only important difference between hetero/homodyne methods and this method is the use of an energy detector, as opposed to the highly nonlinear nanoantenna detector. Energy detectors only allow for a narrow detection bandwidth that is confined to the amplitude spectrum of the local oscillator (i.e. the driver pulse), corresponding to the shaded region in FIGS. 11A-11B. Unlike energy detectors, the broadband response of the nonlinear nanoantenna detectors could enable simultaneous tracking of linear and nonlinear light-matter interaction dynamics. Using few-cycle visible and near-infrared driver pulses to sample weaker, phase-locked mid-infrared transients would not require MIR detectors, with their limited capabilities, that are slow or that require cryogenic cooling. The reduced pulse energy requirements and compact form-factor of on-chip nanoantenna detectors like those presented herein could thus be used to enhance the performance of emerging frequency-comb spectroscopy systems.

While other direct time-domain optical sampling techniques for visible and near-infrared optical pulses currently exist, such as time-domain observation of an electric field (TIPTOE) and attosecond streaking, they require µJ- to mJ-level pulse energies, bulky apparatus, and/or vacuum enclosures. By providing a compact platform that enables sub-cycle, field-sensitive detection of sub- to few-fJ optical waveforms in ambient conditions, devices similar to those discussed in this work could find applications such as phase-resolved spectroscopy and imaging and could have an impact in a variety of fields such as biology, medicine, food-safety, gas sensing, and drug development. In particular, due to their compact footprint and pJ-level energy requirements, such detectors could be used to enhance the performance and operating bandwidth of frequency comb spectroscopy systems. Further-more, such on-chip petahertz field-sampling devices will enable fundamental investigations such as the time-domain characterization of attosecond electron dynamics and optical-field-driven nonlinear phenomena in light-matter interactions.

Methods

Experimental Methods

The nanodevice was illuminated by a few-cycle, supercontinuum-based, CEP-stabilized fiber laser source. The source has a central wavelength of ~1170 nm, with a pulse duration of ~10 fs FWHM (~2.5 cycles), and repetition rate of 78 MHz. The supercontinuum was generated from a highly non-linear germanosilicate fiber pumped by a Er:fiber-based laser oscillator and Er-doped fiber amplifier (EDFA) system and compressed with a SF10 prism compressor. The CEP was locked to a fixed CEP value for all measurements taken. Pulse characterization of the laser source was performed by 2DSI and is described in the section on 2DSI Measurement. The spectrum of the laser source was measured with a fiber-coupled optical spectrum analyzer (Ando Electric Co., Ltd.).

A dispersion-balanced Mach-Zehnder interferometer was used to generate the pulse pairs for the experiment. An Inconel reflective ND filter of OD 4 on a 2 mm thick BK7 substrate (Thorlabs) was placed in one arm and used to generate a weak signal pulse with pulse energy of ~5 fJ. An optical chopper was placed in this weak arm for lock-in amplification and detection. The strong, driver arm had a pulse energy of ~50 pJ. A corresponding 2 mm thick BK7 window was placed in the driver arm to balance the dispersion between arms. The added chirp from the glass was precompensated using the prism compressor. The delay between the two pulses was controlled with a home built 15 µm piezo stage. A chopper was placed in the weak arm to modulate the signal for lock-in amplification.

The pulses were focused onto the chip using a Cassegrain reflector to a spot-size of 2.25 µm×4.1 µm FWHM. This spot-size allowed for illumination of 10-15 nanoantennas at a time. The polarization of the pulses was parallel to the nanoantenna height axis. The emitted current was collected and amplified by a transimpedance amplifier (FEMTO Messtechnik GmbH) in conjunction with a lock-in amplifier (Stanford Research Systems), with a modulation of 200 Hz of the optical chopper.

For each data set, 60 scans of 10 second acquisition time over the 100 fs time window were performed. Post-processing was done in Matlab. Each data set was Fourier transformed and windowed from 150 THz to 350 THz with a tukey-window steepness of $\alpha=0.2$. The resulting output was averaged in the time-domain.

Device Fabrication

The data presented in Example 1 comes from devices fabricated on two different chips. The devices were fabricated on BK7 substrates. The patterning was performed using an electron beam lithography process with PMMA A2 resist (Microchem), a writing current of 2 nA, a dose of 5000 µC/cm$^2$, and an electron beam energy of 125 keV. To avoid charging, an Electra92 layer was spin-coated on top of the PMMA at 2 krpm and baked for 2 min at 90° C. Since these are large arrays, a proximity effect correction step was also included when designing the layout. After exposure, the resist was cold-developed in a 3:1 isopropyl alcohol to methyl isobutyl ketone solution for 60 s at 0° C. Then, a 2 nm adhesion layer followed by 20 nm of Au were deposited using electron beam evaporation. As a Ti adhesion layer was used for the 240 nm and Cr for the 200 nm antennas chips. Subsequently a liftoff process in a 65° C. bath of n-methylpyrrolidone (NMP) (Microchem) was used to release the structures. Finally, a photolithography procedure was used to fabricate the contact pads for external electrical connections.

Electromagnetic Simulations

The optical response of the plasmonic nanoantennas was simulated in a finite-element-method electromagnetic solver (COMSOL Multiphysics). The nanoantenna geometry was extracted from SEM images. The refractive index of gold was based on previously known values, and the refractive index of the glass substrate was fixed at 1.5 with negligible dispersion in the simulation spectral range. To simulate nanoantenna arrays, periodic boundary conditions were used. The normally incident plane wave was polarized along the nanotriangle axis (perpendicular to the nanowire). Perfectly matched layers were used to avoid spurious reflections at the simulation domain boundaries. The complex field response $\tilde{H}_{PL}(\omega)=\tilde{E}^{(L)}(\omega)/\tilde{E}(\omega)$ was evaluated as a function of frequency. The field enhancement was defined as the ratio of the near-field at the nanotriangle tip to the incident optical field.

Discussion of Sampling Bandwidth

A strong local electric-field transient (driver) drives the electron emission at the metallic nanoantenna. For simplicity in this section the field driving the emission at a surface, $E_D(t)$, will be discussed. When a weak electric-field waveform (signal) perturbs the emission process, the detected time-averaged current is proportional to the electric field of the small signal. The small-signal gain, as defined by $$\frac{d\Gamma}{dE}\bigg|_{E_D(t)},$$

is therefore dictated by the strong driving electric field waveform. To demonstrate the influence of the FWHM of the driving pulse duration on the sampling bandwidth, the $\tilde{H}_{Det}(\omega)$ was calculated for 1-, 3-, 5-, 7-, and 9-cycle $\text{sech}^2$ driver pulses each with a central frequency of 250 THz and a peak field strength at the antenna surface of 15 GV/m (see FIG. 13A).

The small-signal gain $$\frac{d\Gamma}{dE}\bigg|_{E_D(t)}$$

was calculated by assuming Fowler-Nordheim tunneling emission with a characteristic tunneling field of $F_t=78.7$ V $\text{nm}^{-1}$. FIG. 13B shows the effective gate signal $$\frac{d\Gamma}{dE}\bigg|_{E_D(t)}$$

for the sampling process for each pulse duration. Only the single-cycle pulse (blue) exhibits an isolated peak. However, for driver pulses with an increasing number of cycles, satellite pulses start to emerge. For the 9-cycle case (green traces) the height of satellite pulses at −4 fs and 4 fs approach the height of the center peak. FIG. 13C shows the Fourier transform of $$\frac{d\Gamma}{dE}\bigg|_{E_D(t)}.$$

The sampling bandwidth generated by a single-cycle field transient shows a smooth response from DC to 1.8 PHz and corresponds to the Fourier transform of the isolated peak in FIG. 13B (blue traces). With increasing pulse duration, the bandwidth becomes increasingly modulated due to the destructive interference of the additional peaks in the gate signal. The modulation is periodic with the frequency $f_0$ of the driving electric field at 250 THz and exhibits maxima at the higher harmonics $n \cdot f_0$ for $n \in \mathbb{N}$. Although a 5-cycle driver waveform results in strong modulation of the sampling response $\tilde{H}_{Det}(\omega)$, the sampling response does not completely vanish at the minima (yellow traces). However, for driver pulses having a FWHM duration greater than five cycles, it was found that the sampling response completely vanishes at the minima. This sampling technique allows for detection of higher harmonics of the driving signal regardless of the pulse duration, which originates from the fact that the individual peaks are deeply sub-cycle in duration.

Carrier-Envelope Phase Discussion

The carrier-envelope phase (CEP) of a few cycle pulse plays a significant role in strong-field physics and heavily influences the electron emission characteristics from resonant nanoantenna devices. In this section the role of the driving waveform's CEP in the sampling process is discussed. For simplicity in this section the field driving the emission at a surface, $E_D(t)$, is discussed.

For the analysis, the complex sampling response $\tilde{H}_{Det}(\omega)$ was calculated assuming a $\text{sech}^2$ driving pulse with a central frequency of 250 THz and a pulse duration of 10 fs (~2.5 cycle), as given by the output of the laser used to experimentally verify device performance. As in the Discussion of Sampling Bandwidth section, the incident electric field was taken to be 15 GV/m. The results are plotted in FIG. 14A for various CEP values of the driving pulse. The small signal gain $$\frac{d\Gamma}{dE}\bigg|_{E_D(t)}$$

was calculated by assuming Fowler-Nordheim tunnel emission with a characteristic tunneling field of $F_t=78.7$ V $\text{nm}^{-1}$ and is plotted in FIG. 14B. In FIG. 14C the complex sampling response $\tilde{H}_{Det}(\omega)$ derived from $$\frac{d\Gamma}{dE}\bigg|_{E_D(t)}$$

is shown.

The CEP, $\Phi_{CEP}$, of the driving pulse dictates the amplitude of the modulation of $\tilde{H}_{Det}(\omega)$. For the driver pulse duration modeled in FIG. 14A, a cosine shaped pulse ($\Phi_{CEP}=0$) exhibits minimal modulation of the sampling bandwidth, which corresponds to an isolated electron burst with small satellites in the time-domain if the pulse is sufficiently short (see FIG. 13B). A CEP of $\Phi_{CEP}=\pi$ corresponds to a negative cosine shaped pulse, which corresponds to two electron bursts of equal height, resulting in the sharp minima in the sampling bandwidth as shown in FIG. 14C (dotted traces). More importantly, with an adequately short driving pulse, it is possible to choose an appropriate @CEP value such that only one electron burst dominates the field emission process, resulting in a smooth, unmodulated $\tilde{H}_{Det}(\omega)$ from DC to 1 PHz, as shown in FIG. 13C. Nevertheless, independently of $\Phi_{CEP}$ a full octave of spectrum can still be sampled with distortion due to H Det.

Another important characteristic of the sampling process to consider is the absolute phase of the sampled output. When $\Phi_{CEP}=0$, a dominant electron burst exists in the time domain and the absolute phase of the signal pulse will be transferred to the sampled output, as $\tilde{H}_{Det}(\omega)$ will be a purely real function (see FIG. 14C). For comparison, if $\Phi_{CEP}=0$ the spectral phase of $\tilde{H}_{Det}(\omega)$ is not flat. As shown in FIGS. 14A-14C, this phase resembles a stair function with plateaus of flat phase around the central frequency $\omega_0$ and its harmonics. Looking closely at FIGS. 14A-14C, one can see that the spectral phase at the nth harmonic can be written as $\angle \tilde{H}_{Det}(n\omega)=n \cdot \Phi_{CEP}$ for $n \in \mathbb{N}$. With these spectral phase behaviors, one can then see that the constant phase component of the sampled output becomes the difference between that of the sampling pulse, $n \cdot \Phi_{CEP}$, and that of the signal, $\Phi_S$. Therefore, the constant, or absolute, phase of the sampled output can be written $\Phi_{S-n} \cdot \Phi_{CEP}$. In the case where the driving pulse, $E_D$, and the signal pulse, $E_S$, originate from the same laser source, they will share a common $\Phi_{CEP}$, and in this case, the absolute phase of the sampled pulse will therefore be zero. It is important to note that this result is independent of $\Phi_{CEP}$, and even laser sources with a carrier envelope offset $f_{CEO}=0$ can be used for sampling. Lastly, in stark contrast to other phase-sensitive techniques, like homo- and hetero-dyne detection, the absolute phase of $E_D$ can be derived unambiguously in-situ from the field emission current generated by $E_D$ in the devices of Example 1.

Field-Sampling Measurements with 200 nm Devices

This technique was also tested using devices consisting of triangular antennas with a 200 nm height. These devices were designed to be off-resonant with the laser pulse and were fabricated on a separate chip from the 240 nm antenna. FIG. 15A presents the acquired cross-correlation trace (blue) for these devices. For each data set, 47 scans of 5 seconds acquisition time over the 100 fs time window were performed. Post-processing was done in Matlab. Each data set was Fourier transformed and windowed from 150 THz to 350 THz with a tukey-window (steepness of $\alpha$=0.2). The resulting output was averaged in the time-domain.

A good agreement was found between the measured trace (blue) to the simulated local signal field, $E^{(L)}(t)$ (red). Both the measurement and simulated local signal fields are both slightly shorter than the calculated laser output. The reason for this is apparent when examining the pulses in the frequency domain as shown in FIG. 15B. While the main spectral peak at ≈220 THz agrees with the measured laser spectrum and the expected antenna response, both the simulated and experimental local signal field spectra exhibit an enhanced shoulder out to 300 THz relative to the measured laser output spectrum. This is due to the plasmonic resonance which enhances these higher frequency components, resulting in a shorter time domain response of the local fields relative to the incident fields after interaction with the antenna.

Data Processing and Error Analysis

To determine the error in the measurement, the Fourier transform of the each of the ~50 individual data sets was measured, and a tukey-window was applied in the Fourier-domain with a steepness of $\alpha$=0.2 from 150 THz to 350 THz. The windowed data sets were then back transformed into the time-domain and averaged for each time coordinate over all data sets. To determine the 1$\sigma$-confidence interval the standard deviation was calculated for each time coordinate over all data sets. The result is shown in FIGS. 16A-16B and compared to the respective simulation shown in FIGS. 12A-12B for the 240 nm devices and FIGS. 15A-15B for the 200 nm devices.

2DSI Measurement

In order to characterize the spectral phase of the supercontinuum source two-dimensional spectral shearing interferometry (2DSI) measurements were performed. Two spectrograms were obtained for the measurement: the first with the laser in similar conditions to that of the experiment, and the second with an added 1.5 mm fused silica window placed in the beam path. The spectrogram of the source in the experimental conditions is shown in FIG. 17A. The second spectrogram taken with an additional propagation through 1.5 mm fused silica was used to calibrate the shear frequency $f_{shear}$ and upconversion wavelength $\lambda_{up}$ needed for group delay retrieval from the 2DSI measurement. Using an optimization routine, the values for $f_{shear}$ and $\lambda_{up}$ were found that resulted in the minimum error between the group delay difference measured with and without the fused silica using 2DSI and that predicted using the known optical properties of fused silica. The resulting retrieved group delay and the spectrum of the laser source are reported in FIG. 17B.

Example 2—Balanced Detection

Disclosed herein is a modification of the sampling scheme that can improve the sensitivity of the sampling technique by removing unwanted background offset signal. Here, a balanced detection scheme as shown in the apparatus 400 of FIG. 4A is employed. In the apparatus 400, the device(s) 100 are formed such that their nanoantennas 410 are alternatively disposed on both the anode element 415 and the cathode element 420 as illustrated. However, the elements 415, 420 are curved (e.g., in a meandering manner) such that adjacent devices 100 have perpendicular orientations with respect to each other, i.e., as illustrated in FIG. 4A, axis A-A' and axis B-B' defined by the direction of the tunneling current generated at each device are perpendicular for adjacent devices. During operation, the driver signal is polarized so that the field component along axis A-A' is negative and along axis B-B' is positive. The currents induced by the modulation of the driver signal are then additive (IsA−(−IsB))=IsA+IsB.

Specifically, the driver pulses and the signal pulses can be selected to have perpendicular (linear) polarizations with respect to each other. In particular, the driver pulses can be polarized such that at a given time t they have a positive electric field component when projected along the long axis of the nanoantennas 410 disposed on both the anode elements 415 and the cathode elements 420, while the signal pulses can be polarized such that at a given time t they have a positive electric field component when projected along the long axis of the nanoantennas 410 of one of the elements 415, 420, and a negative electric field component with respect to the other of the elements. In this manner, the background offset caused by the driver pulses can be balanced (i.e., the two components cancel each other out) while the desired current signal from the two antenna components are summed. The apparatus 400 can hence improve the signal-to-noise (SNR) of detection and enable the detection of weaker signals by: (1) the reduction or elimination of common-mode noise; and (2) providing for the application of larger gain factors (i.e. higher sensitivities) in the current detector. FIGS. 4B and 4C illustrate comparative plots, with FIG. 4B illustrating the detected current with the background signal of the driver pulses present, and FIG. 4C illustrating the detected current with the background signal of the driver pulses removed.

Example 3—Waveguide-Integrated Detector

Aspects disclosed herein can include or be formed on or encompass an integrated photonics chip, with the pump and signal pulses coupled to the devices 100 through waveguides instead of free-space. FIG. 5 illustrates a photonic chip 500 including a substrate 505. In this scheme, the nanoantennas 520 are placed on top of a waveguide 510 that guides the driver pulses 530 and the signal pulses 525 along its length. The nanoantennas 520 interact with the optical field (e.g., via evanescent coupling) during propagation to generate tunneling currents, and detection can be carried out using a current detector as described herein for the free space setup of FIGS. 1A and 1B. The spacing d between adjacent antennae is chosen such that the carrier-envelope phase (CEP) is the same at each antenna. While some signal loss is expected with evanescent coupling, in some applications, this design can still be leveraged since the nanoantennas 520 along the length of the waveguide 510 keep interacting with the signal downstream. The number of antennas 520 can be selected to minimize signal loss.

In some cases, the chip 500 can be used in an alternative configuration to detect the absolute phase (carrier-envelope phase) of the signal pulses 525, as illustrated in FIG. 6B for a waveguide-based setup, although free-space operation is also possible. Here, a symmetric configuration for the nanoantennae, i.e., two antennas with their tips facing each other (e.g., separated by about 10-100 nm) as shown in FIG. 6B, instead of a rectified configuration as shown in FIG. 1A, can be employed. The configuration of FIG. 6B doesn't require driver pulses because in this configuration one is not sampling the field but measuring the carrier envelope phase (CEP) variation of the optical pulse. This requires evaluation of the relative variation of the current integral across the pulse (i.e., the sum of the current bursts emitted at each half cycle). For example, a CEP of 0 would correspond to the condition of maximum current integral, while a CEP of $\pi$ would correspond to a null current integral. FIG. 6A illustrates a field waveform of the enhanced pulse at the tip of the first antenna of the device of FIG. 6B and the resulting attosecond photocurrent bursts. The total current alternates when the phase of the pulse is shifted. FIG. 6C illustrates cross-sectional field distribution both at the input port of the waveguide of FIG. 6B and at the center of one of the devices of FIG. 6B (i.e., between two antennae of the same device) for an injected signal wavelength of 1.55 micrometers. The waveguide and antenna sizes can be tuned to operate at different wavelengths such as, for example from the visible through to the mid-infrared depending on the geometry and optical properties of the material of the waveguide and/or antennae. This configuration can have important applications in ultrafast information processing where lightwave-based PHz electronics are desirable.

Example 4—Pulse Detection for Information Technology

Biased nanoantenna arrays (e.g., the apparatus 150) can also be used for pulse detection of weak signals instead of/in addition to field sampling. In this a fixed delay between the driver pulses and signal pulses can be employed. For information transmission, at least two configurations are possible:

Amplitude Modulation (AM): in this case, the nanoantenna(s) can be used in a rectified configuration, e.g., that of FIG. 1A with a single nanoantenna per device. The driver pulses are present at their normal repetition rate; however the signal pulses can be switched on and off depending on whether a binary 1 or a binary 0 is to be encoded. In the detected current then, when a disturbance is detected it is read as a 1, when it is not, it is read as a 0.

Phase Modulation (PM): in this case, the nanoantenna(s) can be used in a symmetric configuration, e.g., that of FIG. 6B with two antennae per device, and the signal pulses can be programmed to have a different Carrier Envelope Phase (CEP) depending on whether a binary 1 or a binary 0 is being encoded (e.g., 180° phase for "1" and 0° phase for "0"). This configuration doesn't require driver pulses, but rather measures the carrier-envelope phase of the pulse to be detected.

Example 5—Single-Shot Detection

In the configuration illustrated in FIG. 7 and substantially similar to the two antennae-per-device setup of FIG. 6B, the driver and signal pulses are counter-propagating through the waveguide so that each device of the apparatus 150 experiences each pulse at a different delay than each other device. The driver pulses propagates one way, and the signal pulses the other way along the length of the waveguide. The charge at the tip of each nanoantenna along the waveguide, if individually addressed, can reflect the signal pulses for different delay values. The nanoantennas can be read out separately, and the readouts can be combined to reconstruct the signal as each antenna's signal represents a measurement at a unique time delay $\Delta t$. The charge from each antenna readout can be read out using a charge-coupled device (CCD). If enough signal is generated at each antenna for a single incident pulse to be detected by the CCD unit, and each CCD was read out before the arrival of the next pulse, this configuration can be useful for single-shot sampling of each pulse with attosecond resolution (petahertz bandwidth).

As another example, FIG. 8 illustrates a configuration that employs tilted driver pulses 830 impinging on the nanoantennas. The driver pulses are tilted with respect to the signal pulses 825 and results in an incremental, differential delay for different nanoantennas integrated across the surface of a chip. The different delays for the different devices can be useful for single-shot detection of the signal waveform. Specifically, since the wavefront of the driver pulses are tilted, they arrive at different times with respect to each other. Hence, there is no need to scan the delay since all the delays can be measured in a single shot when the antennas are independently read out.

Example 6—4D Hyperspectral Imaging

FIG. 9 illustrates a setup 900 that can be useful for chip-scale, optical-field-resolved 4D (x, y, z, t or f) hyperspectral imaging. Generally, unlike conventional approaches to hyperspectral detection that convert spectral information into spatial information to reduce effective imaging area, the setup of FIG. 9 leverages time-domain optical field sampling to provide a complete spectrum in amplitude and phase at every unit cell of the detector. This complex spectral information can provide a wealth of data to the user. For example: central frequency variations of the returning waveform due to doppler shifts provide velocity information; time of flight of the pulse's leading edge provides depth information; and the tail of the returning field waveform contains molecular vibrational information for highly-selective molecular fingerprinting.

In FIG. 9, ultrafast probe pulses 905 are projected onto a scene/target to be imaged using a metaphotonic element (""spatio temporal collimator+waveform preparation") that shapes the waveform in space and time. Upon returning, a computational metasurface element 915 pre-processes the returning waveform thereby reducing computational requirements in post-processing. The processed waveform is projected onto a focal plane array 925 composed of petahertz electronic nanoantenna detectors 930 (1 PHz=$10^{15}$ Hz). These arrayed detectors 930 (e.g., each element being similar to the apparatus 150) each sample the electric field in time. The sampling process is illustrated in the bottom half of FIG. 9. A few-cycle optical pulses 935 drive a highly nonlinear tunneling process from each nanoantenna's surface, creating a sub-femtosecond activation window 940. If a signal field 945 is present at the detector during this time, the output current is modulated. The current replicates the signal waveform 945 in time when with delay between the drive and signal pulse $\Delta t$.

Applications for the setup 900 can include spatially-molecular finger-printing for standoff detection of airborne toxins and explosives, operation in environments with intense ambient light (e.g. on account of flames), phase-resolved medical imaging, super-resolution microscopy, and environmental monitoring.

For example, for spatially-molecular finger-printing for standoff detection of airborne toxins and explosives, the setup 900 can take an image of a scene/target and for each pixel one would be able to see not only the intensity of that pixel but also the fingerprint of the molecules that the light passed through while reaching that pixel. One can essentially image an environment and visualize what molecules are in the air at each spatial point. Each molecule vibrates when excited by the incoming light and modifies the signal that is detected by the setup 900.

As another example (operation in environments with intense ambient light such as on account of fire/flames), the setup 900 can be tuned to respond to certain wavelengths. Coherent signal from behind an explosion can be resolved while the signal coming from the explosion itself would be incoherent and can be tuned out.

As yet another example (phase-resolved medical imaging), medical imaging typically resolve the spectrum of the signal, so a lot of information is lost. With the setup 900, each pixel of the medical image acquired can be resolved for both spectrum and phase, which in turn is more informative.

As yet another example (Hyperspectral super-resolution microscopy) similar to the medical imaging application, the setup 900 can be used to resolve phase as well as spectral information while imaging a microscopic sample. When amplitude and phase on a given imaging plane is known, one can back-calculate it at each point in any other imaging plane, so one can acquire a microscopy image with a much higher effective numerical aperture.

As yet another example, (environmental monitoring), similar to molecular finger-printing applications, one can detect a leak of a chemical in a certain environment or the beginning of a fire based on imaging a variation of the signal fingerprint coming from a certain location due to the light passing through the released chemical/fire.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of detection of an incident optical signal including a set of incident pulses, comprising:
    applying, to a set of optical detectors formed on a substrate, a driving optical signal including a set of driving pulses, wherein each optical detector of the set of optical detectors includes:
        an antenna electrode configured as a cathode and having a tip shaped to enhance a local electric field generated in response to the driving optical signal; and
        a wire electrode configured as an anode and positioned such that the tip of antenna electrode and the wire electrode generate a photocurrent therebetween via tunneling in response to the driving optical signal;
    applying, to the set of optical detectors, the incident optical signal with variable delay with respect to the driving optical signal to modulate the photocurrent from each optical detector of the set of optical detectors as a function of the variable delay;
    detecting, via a current detector coupled to the set of optical detectors, an integrated photocurrent based on the photocurrent from each antenna electrode of the set of optical detectors; and
    detecting a presence of the incident optical signal in response to the integrated photocurrent exceeding a predetermined threshold,
    wherein a separation between the tip of the antenna electrode and the wire electrode for each detector is selected such that, in an absence of the driving optical signal, no photocurrent is generated between that antenna electrode and that wire electrode.

2. The method of claim 1, wherein the set of optical detectors is a first set of optical detectors of a plurality of detectors formed on the substrate, and wherein a surface area of the first set of optical detectors on the substrate is at least equal to a spot area of the driving optical signal.

3. The method of claim 1, further comprising applying, to the set of optical detectors, a bias voltage or a bias current to improve sensitivity of the detection of the integrated photocurrent.

4. The method of claim 1, wherein the applying the driving optical signal includes applying the driving optical signal via free-space coupling of the driving optical signal to the set of optical detectors.

5. The method of claim 1, wherein the applying the incident optical signal includes applying the incident optical signal via free-space coupling of the incident optical signal to the set of optical detectors.

6. A method of detection of an incident optical signal including a set of incident pulses, comprising:
    applying, to a set of optical detectors formed on a substrate, a driving optical signal including a set of driving pulses, wherein each optical detector of the set of optical detectors includes:
        an antenna electrode configured as a cathode and having a tip shaped to enhance a local electric field generated in response to the driving optical signal; and
        a wire electrode configured as an anode and positioned such that the tip of antenna electrode and the wire electrode generate a photocurrent therebetween via tunneling in response to the driving optical signal;
    applying, to the set of optical detectors, the incident optical signal with variable delay with respect to the driving optical signal to modulate the photocurrent from each optical detector of the set of optical detectors as a function of the variable delay;
    detecting, via a current detector coupled to the set of optical detectors, an integrated photocurrent based on the photocurrent from each antenna electrode of the set of optical detectors; and
    detecting a presence of the incident optical signal in response to the integrated photocurrent exceeding a predetermined threshold,
    wherein an intensity of the incident optical signal is at most 1/1000th of an intensity of the driving optical signal.

7. A method of detection of an incident optical signal including a set of incident pulses, comprising:
    applying, to a set of optical detectors formed on a substrate, a driving optical signal including a set of driving pulses, wherein each optical detector of the set of optical detectors includes:
        an antenna electrode configured as a cathode and having a tip shaped to enhance a local electric field generated in response to the driving optical signal; and
        a wire electrode configured as an anode and positioned such that the tip of antenna electrode and the wire electrode generate a photocurrent therebetween via tunneling in response to the driving optical signal;
    applying, to the set of optical detectors, the incident optical signal with variable delay with respect to the driving optical signal to modulate the photocurrent from each optical detector of the set of optical detectors as a function of the variable delay;
    detecting, via a current detector coupled to the set of optical detectors, an integrated photocurrent based on the photocurrent from each antenna electrode of the set of optical detectors; and
    detecting a presence of the incident optical signal in response to the integrated photocurrent exceeding a predetermined threshold,
    wherein the modulation of the photocurrent peaks in response to a central pulse of the driving optical signal overlapping with a central pulse of the incident optical signal.

8. An apparatus for optical sampling, comprising:
    a substrate;
    a set of optical detectors coupled to the substrate, wherein each optical detector of the set of optical detectors includes:
        an antenna electrode configured as a cathode and having a tip shaped to enhance a local electric field generated in response to a driving optical signal applied to the set of optical detectors; and a wire electrode configured as an anode, and positioned such that the tip of antenna electrode and the wire electrode generate a photocurrent therebetween via tunneling in response to the driving optical signal, wherein the set of optical detectors are further configured to receive an incident optical signal with variable delay with respect to the driving optical signal, such that the photocurrent from each optical detector of the set of optical detectors is modulated as a function of the variable delay; and a current detector coupled to the set of optical detectors to detect an integrated photocurrent based on the photocurrent from each antenna electrode of the set of optical detectors, such that a presence of the incident optical signal is detectable in response to the integrated photocurrent exceeding a predetermined threshold, wherein a separation between the tip of the antenna electrode and the wire electrode for each optical detector of the set of optical detectors is selected such that, in the absence of the driving optical signal, the integrated photocurrent is below the predetermined threshold.

9. The apparatus of claim 8, wherein a separation between the tip of the antenna electrode and the wire electrode for each optical detector of the set of optical detectors is from about 10 nm to about 100 nm.

10. The apparatus of claim 8, wherein the substrate is transparent at a wavelength of the driving optical signal, a wavelength of the incident optical signal, or both.

11. The apparatus of claim 8, wherein the set of optical detectors receives the driving optical signal, or the incident optical signal, or both, via free-space coupling.

12. The apparatus of claim 8, further comprising a bias circuit coupled to the set of optical detectors to apply a bias voltage or a bias current thereto, to improve sensitivity of the detection of the integrated photocurrent.

13. The apparatus of claim 8, wherein a material, or size, or both, of the antennae of the set of optical detectors is selected based on a photon energy, or wavelength, or both, of the driving optical signal.

14. The apparatus of claim 8, further comprising a waveguide coupled to the substrate to receive the incident optical signal and the driving optical signal, wherein the set of optical detectors are formed on the waveguide.

15. The apparatus of claim 8, wherein an angle of incidence of the incident optical signal on the set of optical detectors is different from an angle of incidence of the driving optical signal on the set of optical detectors.

16. An apparatus for optical sampling, the apparatus comprising:

a substrate;

a set of optical detectors coupled to the substrate, wherein each optical detector of the set of optical detectors includes:

an antenna electrode configured as a cathode and having a tip shaped to enhance a local electric field generated in response to a driving optical signal applied to the set of optical detectors; and a wire electrode configured as an anode, and positioned such that the tip of antenna electrode and the wire electrode generate a photocurrent therebetween via tunneling in response to the driving optical signal, wherein the set of optical detectors are further configured to receive an incident optical signal with variable delay with respect to the driving optical signal, such that the photocurrent from each optical detector of the set of optical detectors is modulated as a function of the variable delay; and a current detector coupled to the set of optical detectors to detect an integrated photocurrent based on the photocurrent from each antenna electrode of the set of optical detectors, such that a presence of the incident optical signal is detectable in response to the integrated photocurrent exceeding a predetermined threshold, wherein each optical detector of a first plurality of optical detectors of the set of optical detectors defines a first axis for the direction of the photocurrent generated between the anode and the cathode of that optical detector, wherein each optical detector of a second plurality of optical detectors of the set of optical detectors defines a second axis for the direction of the photocurrent generated between the anode and the cathode of that optical detector, and wherein the first axis and second axis are perpendicular to each other.

* * * * *